US010437562B2

(12) United States Patent
Nurvitadhi et al.

(10) Patent No.: US 10,437,562 B2
(45) Date of Patent: *Oct. 8, 2019

(54) APPARATUS AND METHOD FOR PROCESSING SPARSE DATA

(71) Applicant: Intel Corporation, Santa Clara, CA (US)

(72) Inventors: Eriko Nurvitadhi, Hillsboro, OR (US); Yu Wang, Hillsboro, OR (US); Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/394,968

(22) Filed: Dec. 30, 2016

(65) Prior Publication Data
US 2018/0189032 A1 Jul. 5, 2018

(51) Int. Cl.
G06F 9/44 (2018.01)
G06F 8/20 (2018.01)
G06F 8/30 (2018.01)
G06F 17/50 (2006.01)

(52) U.S. Cl.
CPC .......... G06F 8/20 (2013.01); G06F 8/30 (2013.01); G06F 17/5045 (2013.01); G06F 2217/08 (2013.01)

(58) Field of Classification Search
CPC .......... G06F 11/3466; G06F 11/3688; G06F 2201/865; G06F 11/3664; G06F 11/3409
USPC .................................................. 717/106, 131
See application file for complete search history.

(56) References Cited

U.S. PATENT DOCUMENTS

2007/0169059 A1* 7/2007 Halambi ............... G06F 8/4452
717/160
2018/0189638 A1* 7/2018 Nurvitadhi ........... G06N 3/0445

FOREIGN PATENT DOCUMENTS

WO 2016209487 A1 12/2016

OTHER PUBLICATIONS

Choi J. W., et al., "Model-Driven Autotuning of Sparse Matrix-Vector Multiply on GPUs," Proceedings of the 15th ACM SIGPLAN Symposium on Principles and Practice of Parallel Programming, ACM, Jan. 9, 2010, pp. 115-125.
Extended European Search Report for Application No. 17211250.0, dated May 4, 2018, 11 pages.

(Continued)

Primary Examiner — Chuck O Kendall
(74) Attorney, Agent, or Firm — Nicholson De Vos Webster & Elliott LLP

(57) ABSTRACT

An apparatus and method are described for designing an accelerator for processing sparse data. For example, one embodiment comprises a machine-readable medium having program code stored thereon which, when executed by a processor, causes the processor to perform the operations of: analyzing input graph program code and parameters associated with a target accelerator in view of an accelerator architecture template; responsively mapping the parameters onto the architecture template to implement customizations to the accelerator architecture template; and generating a hardware description representation of the target accelerator based on the determined mapping of the parameters to apply to the accelerator architecture template.

23 Claims, 27 Drawing Sheets

(56) References Cited

OTHER PUBLICATIONS

Fort B., et al., "Automating the Design of Processor/Accelerator Embedded Systems with LegUp High-Level Synthesis," 2014 12th IEEE International Conference on Embedded and Ubiquitous Computing, IEEE, Aug. 26, 2014, pp. 120-129.

Fowers J., et al., "A High Memory Bandwidth FPGA Accelerator for Sparse Matrix-Vector Multiplication," 2014 IEEE 22nd Annual International Symposium on Field-Programmable Custom Computing Machines, May 11, 2014, pp. 36-43.

Sengupta D., et al., "GraphReduce: Processing Large-Scale Graphs on Accelerator-Based Systems," SC15: International Conference for High Performance Computing Networking Storage and Analysis, ACM, Nov. 15, 2015, 12 pages.

Weisz G., et al., "GraphGen for CoRAM: Graph Computation on FPGAs," The Third Workshop on the Intersections of Computer Architecture and Reconfigurable Logic (CARL 2013), Dec. 7, 2013, 6 pages.

Weisz G., "GraphGen: An FPGA Framework for Vertex-Centric Graph Computation," Dec. 31, 2014, Retrieved from: http://www.gabeweisz.com/graphgen_fccm_2014.pdf, 8 pages.

\* cited by examiner

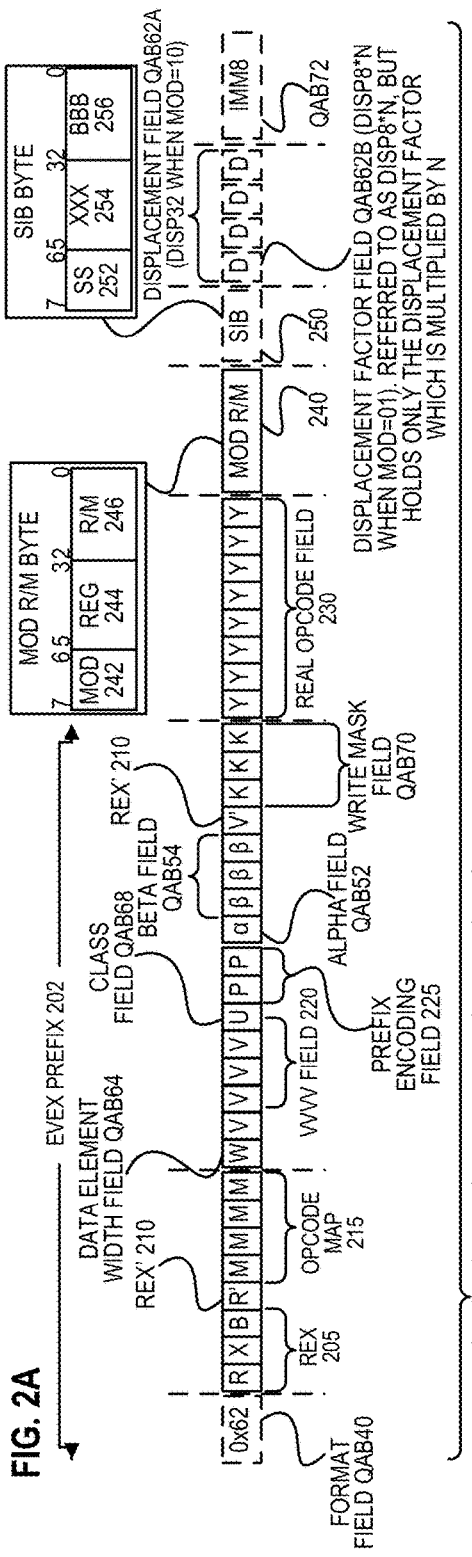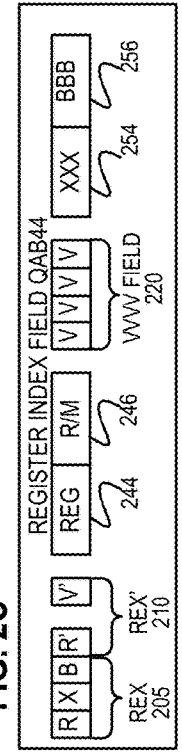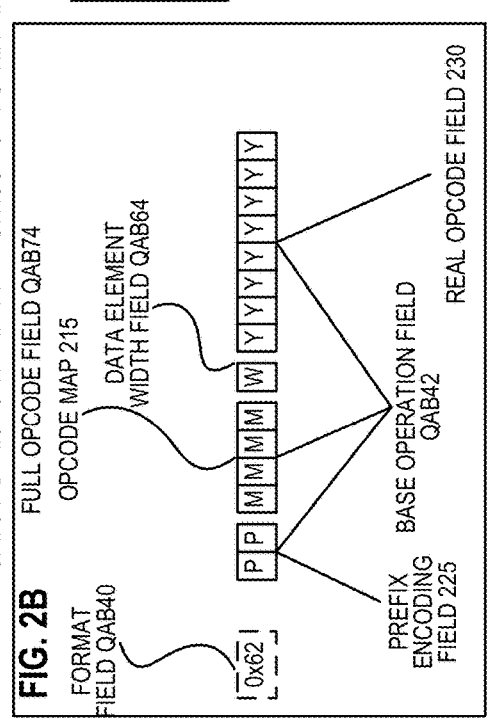

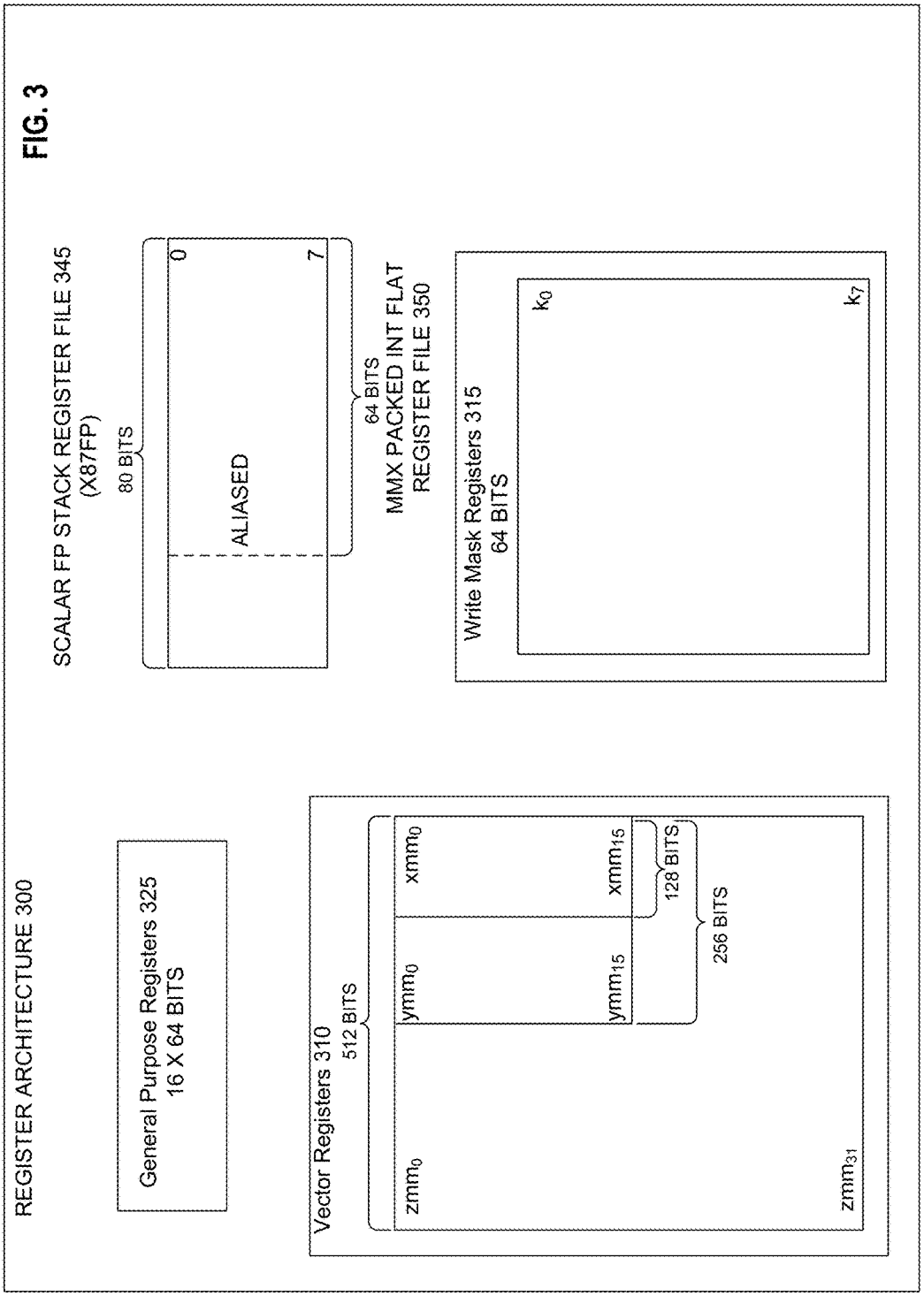

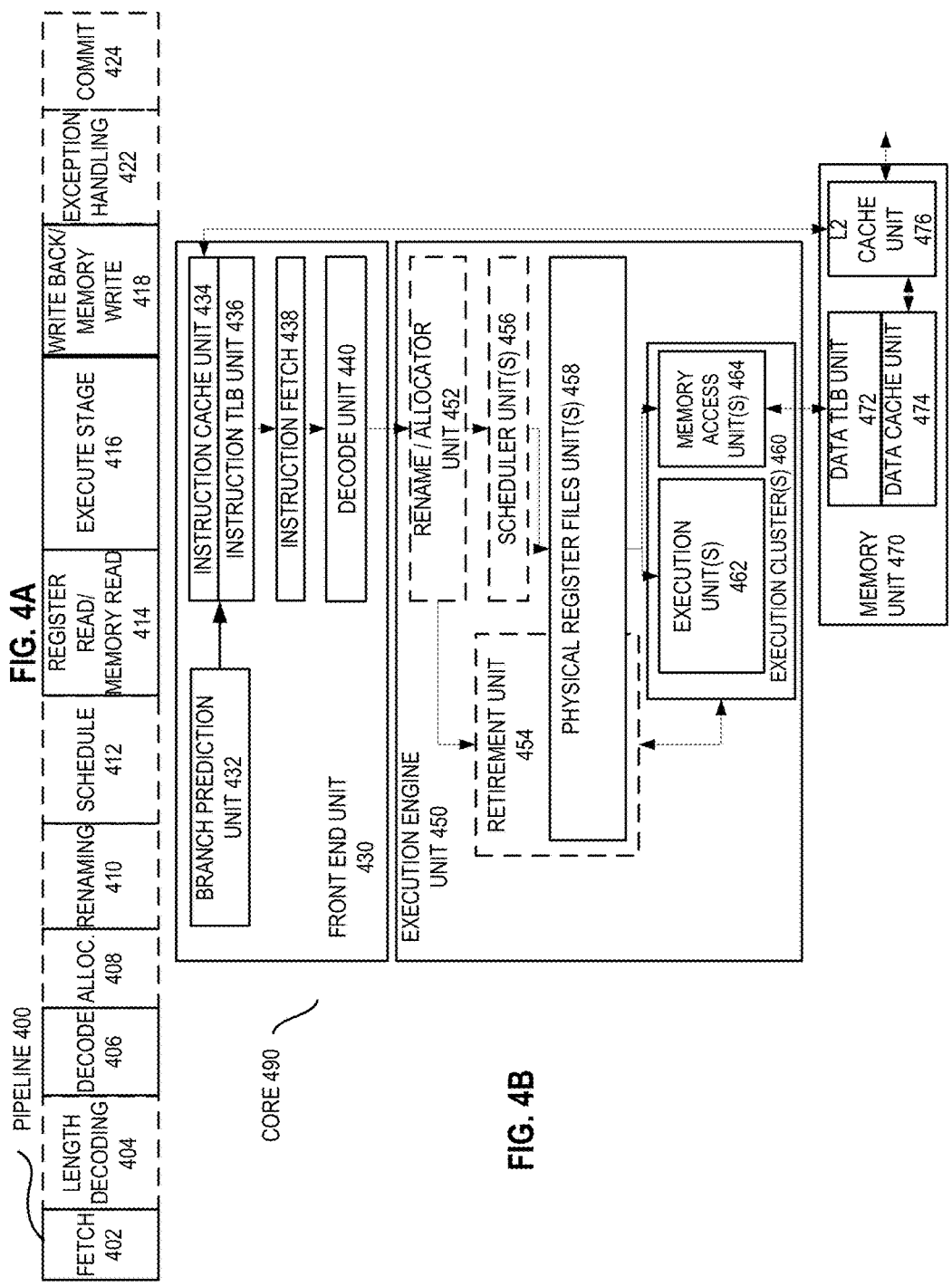

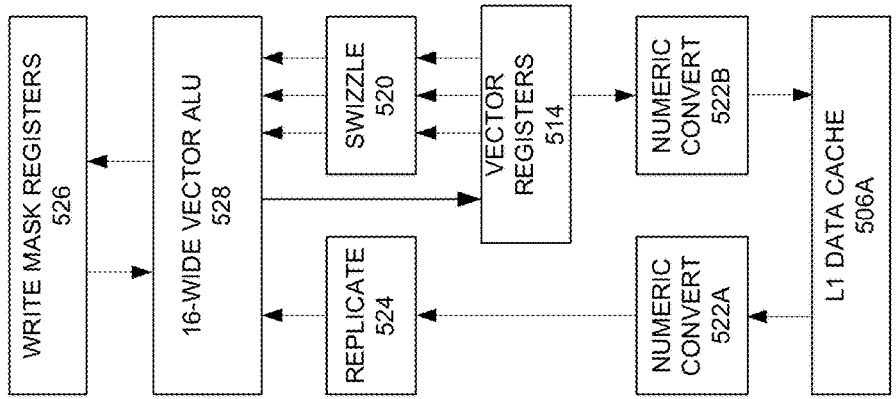
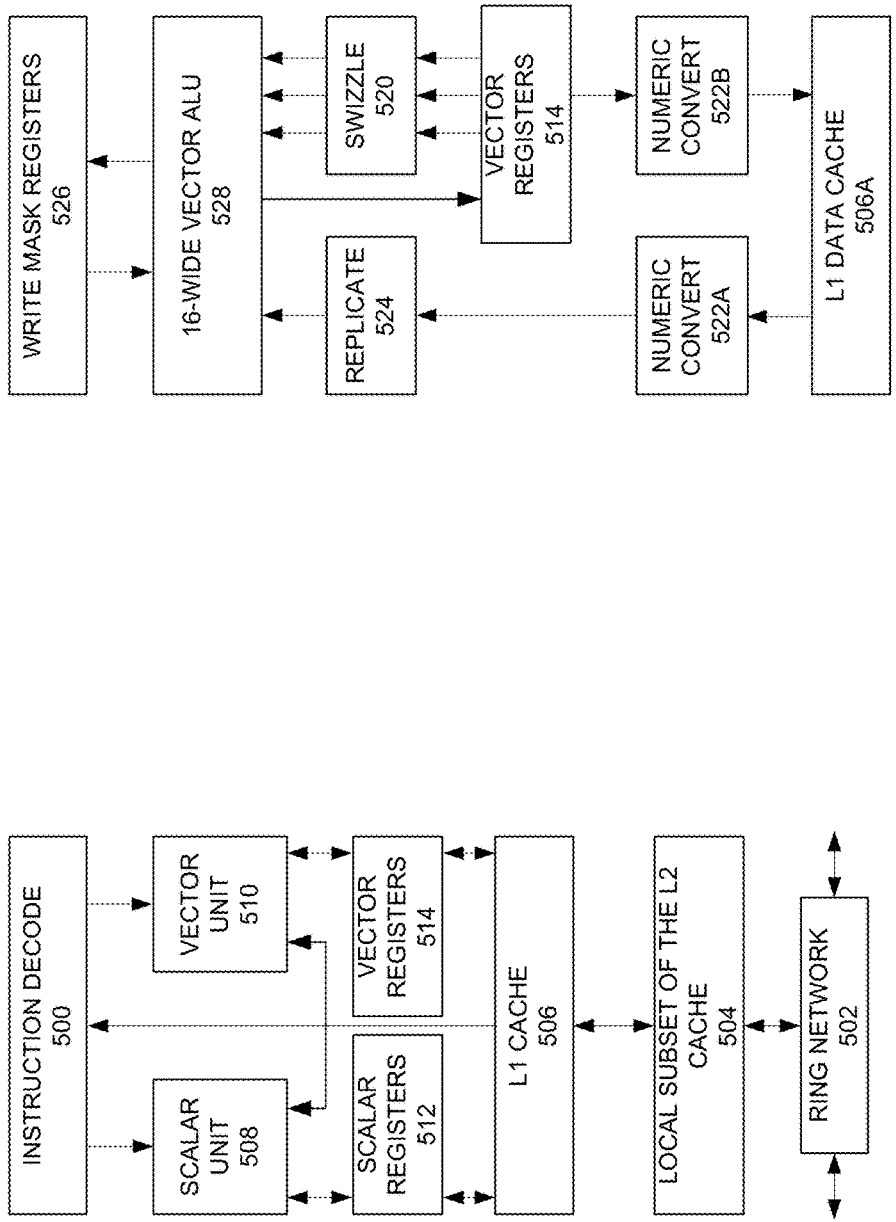

| Operation Type | Input operand1 1410 | Input operand2 1411 | Output 1412 | Matrix Data Format 1413 | Operation Identifier 1414 |
|---|---|---|---|---|---|
| Multiply 1400 | Sparse matrix | Sparse vector | Dense vector | Compressed sparse row (CSR) | mul_spMspV_row |
| | | | | Compressed sparse column (CSC) | mul_spMspV_col |
| | | Dense vector | Dense vector | Compressed sparse row (CSR) | mul_spMdV_row |
| | | | | Compressed sparse column (CSC) | mul_spMdV_col |
| Multiply 1401 | Dense matrix | Sparse vector | Dense vector | Row-oriented | mul_dMspV_row |
| | | | | Column-oriented | mul_dMspV_col |
| | | Dense vector | Dense vector | Row-oriented | mul_dMdV_row |
| | | | | Column-oriented | mul_dMdV_col |
| Scale & Update 1402 | Sparse matrix | Dense vector | | Row-oriented | sau_spMdV |
| | Sparse vector | Sparse vector | | | sau_spVdV |
| Dot product 1403 | Sparse vector | Sparse vector | Scalar | N/A | dot_spVspV |
| | Dense vector | Sparse vector | | | dot_dVspV |
| | Sparse vector | Dense vector | | | dot_spVdV |
| | Dense vector | Dense vector | | | dot_dVdV |

FIG. 14

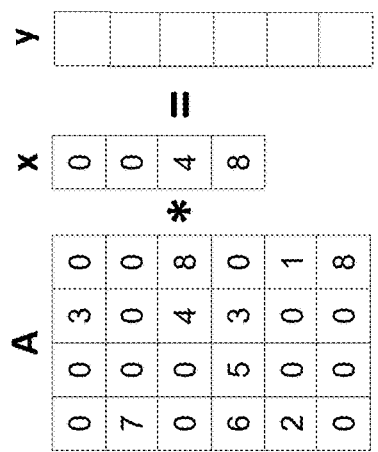
FIG. 15a
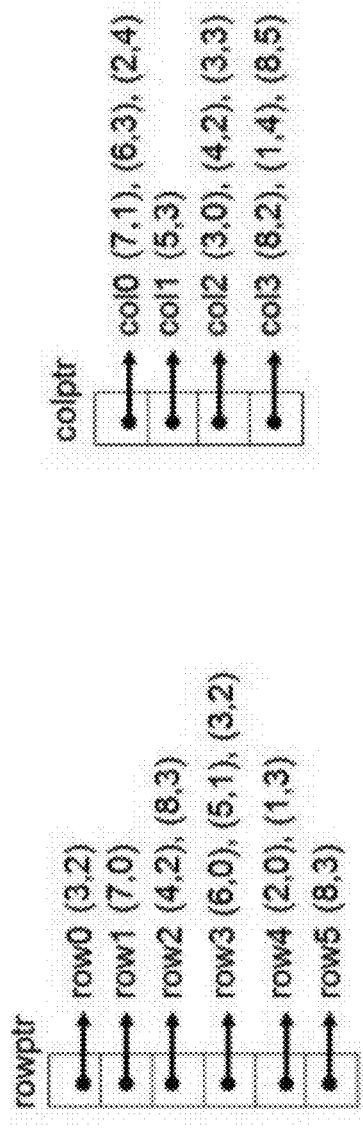
FIG. 15c
FIG. 15b

```
spMdV_csr(A, x, y) {
    for each row r of A {
        y[r.idx] = dot_product(r, x)
    }
}
```

*FIG. 16a*

```
spMspV_csc(A, x, y) {
    for each element x_e in vector x {
        col = get column(x_e.idx) of A
        for each element col_e in col
            y[col_e.idx] += x_e.val * col_e.val
    }
}
```

*FIG. 16b*

```
scale_update(A, x, y) {
    for each row r of A {
        for each element r_e in r
            y[r_e.idx] += r_e.val * x[r.idx]
    }
}
```

*FIG. 16c*

| Category | Details |
|---|---|
| RAMs, buffers | Size, ports, number of banks, shared/private banks |
| Cache | Size, associativity, include/exclude |
| Scaling | Number of tiles, number of PEs/tile |
| Memory interface | Number of interfaces, width, burst size |
| Compute blocks (PROCESS_MSG, REDUCE, SEND_MSG, APPLY) | Content generation strategy (e.g., pipelined, multi-cycle), interface pruning |
| PE scheduling | Scheduling scheme (e.g., row/block interleaved, dynamic) |
| Data storage format | Array of structures, structure of arrays, doubly compressed, unique value compressed |
| Pack/unpack logic | Generation strategy, compression on/off |
| Active vertex handling | Bitvector, N-level compressed |

FIG. 23a

| Tuning considerations | Examples of affected compute parameters |
|---|---|
| Locality of data (x vector) from graph data properties | Cache, interface width |
| Graph data sizes | Sizes of on-chip storage, pack/unpack |
| Graph compute functions | Compute blocks, active vertex handling |
| Graph data structure (non-zeros distribution in adjacency matrix) | Scaling tiles and PEs, memory interfaces, PE scheduling, data storage format |
| Graph data access attributes (read-only, write-only, read/write) | On-chip structures (ports, banks), active vertex handling |
| Graph data types | On-chip structures (ports, banks), pack/unpack |
| Graph data patterns (e.g., commonly recurring values) | Data storage format, pack/unpack logic |

FIG. 23b

APPARATUS AND METHOD FOR PROCESSING SPARSE DATA

BACKGROUND

Field of the Invention

This invention relates generally to the field of computer processors and accelerators. More particularly, the invention relates to an apparatus and method for processing sparse data.

Description of the Related Art

Graph analytics relies on graph algorithms to extract knowledge about the relationship among data represented as graphs. The proliferation of graph data (from sources such as social media) has led to strong demand for and wide use of graph analytics. As such, being able to do graph analytics as efficiently as possible is of critical importance.

There are existing graph analytics frameworks, but they are primarily software frameworks (i.e., running on CPUs of GPGPUs). For the limited graph frameworks which map graph algorithms to customized hardware, their target hardware accelerator architectures are not based on generalized sparse matrix vector multiply. There are existing sparse matrix multiply hardware accelerators, but they do not support customizability to allow mapping of graph algorithms.

BRIEF DESCRIPTION OF THE DRAWINGS

A better understanding of the present invention can be obtained from the following detailed description in conjunction with the following drawings, in which:

FIG. 2A-D is a block diagram illustrating an exemplary specific vector friendly instruction format according to embodiments of the invention;

FIG. 3 is a block diagram of a register architecture according to one embodiment of the invention; and FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

FIG. 5A is a block diagram of a single processor core, along with its connection to an on-die interconnect network;

FIG. 5B illustrates an expanded view of part of the processor core in FIG. 5A according to embodiments of the invention;

FIG. 14 illustrates different sparse data operations employed in one embodiment;

FIGS. 15a-c illustrate formats used for matrix data in one embodiment;

FIGS. 16a-c illustrate pseudocode for operations performed in one embodiment;

FIG. 23a-b illustrate different categories and tuning considerations; and

DETAILED DESCRIPTION

Figure 1A:
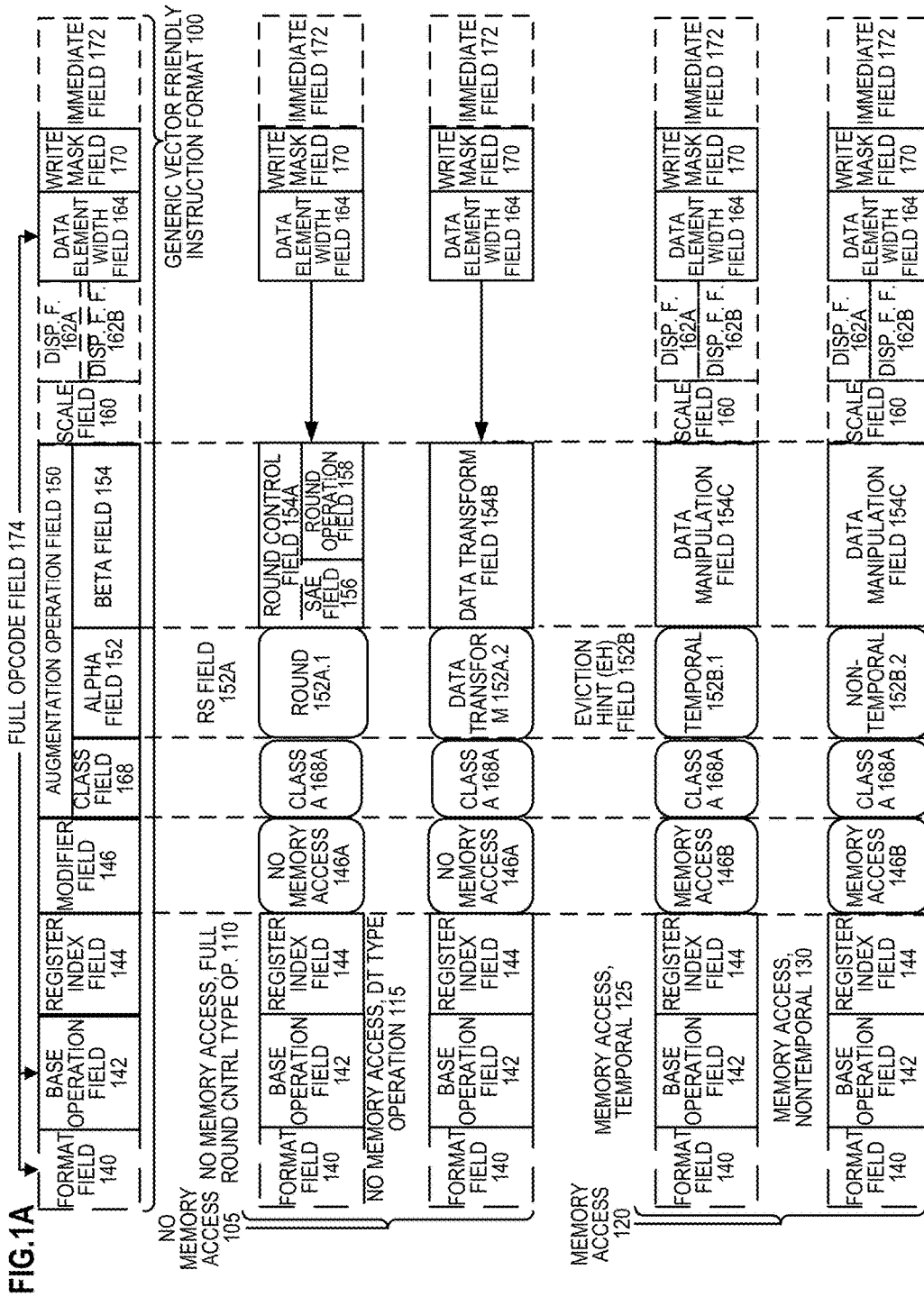
FIGS. 1A and 1B are block diagrams illustrating a generic vector friendly instruction format and instruction templates thereof according to embodiments of the invention.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A. Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
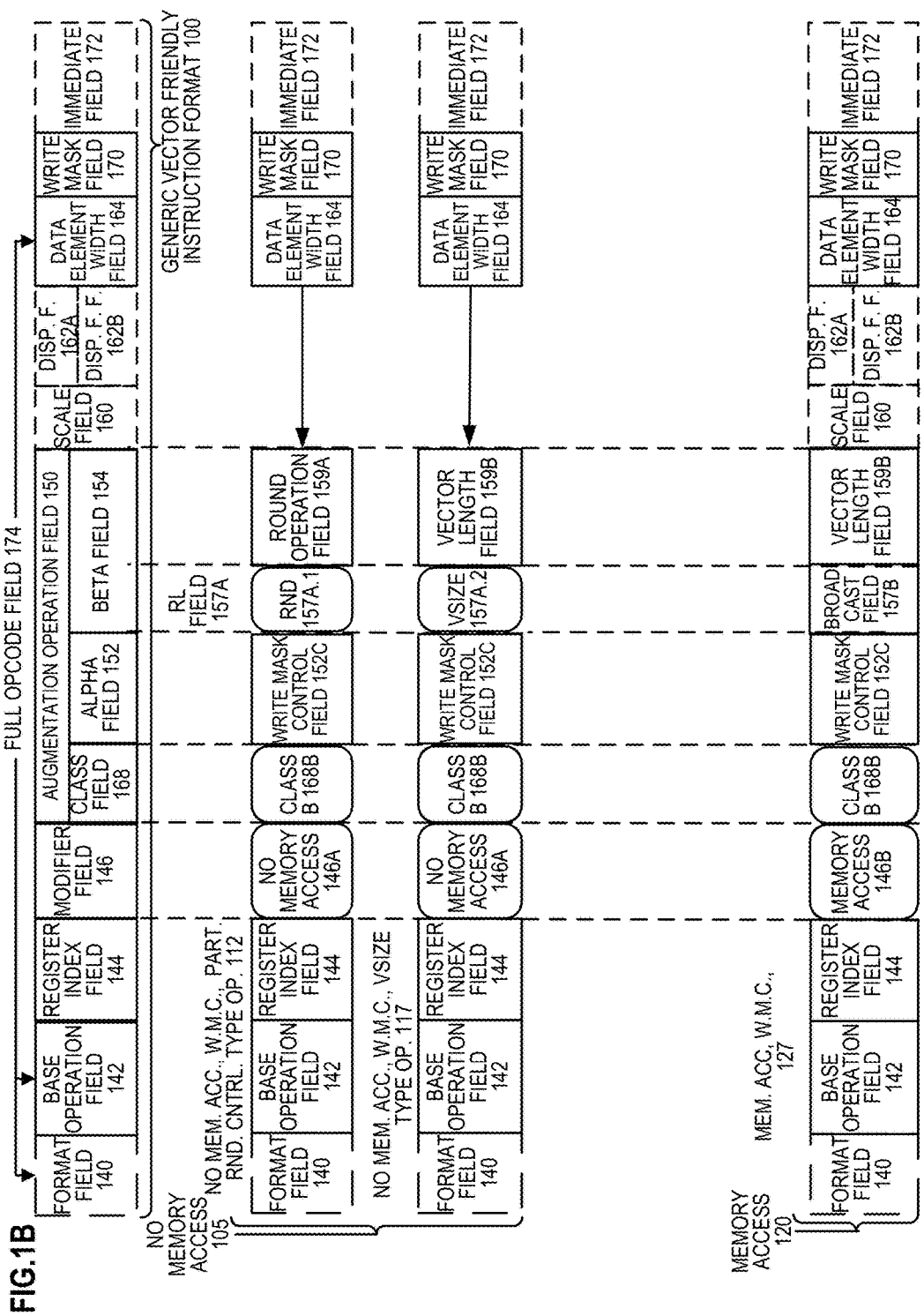

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*index+base$).

Displacement Field 162A—its content is used as part of memory address generation (e.g., for address generation that uses $2^{scale}*index+base+displacement$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

B. Exemplary Specific Vector Friendly Instruction Format

FIG. 2 is a block diagram illustrating an exemplary specific vector friendly instruction format according to embodiments of the invention. FIG. 2 shows a specific vector friendly instruction format 200 that is specific in the sense that it specifies the location, size, interpretation, and order of the fields, as well as values for some of those fields. The specific vector friendly instruction format 200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 1 into which the fields from FIG. 2 map are illustrated.

It should be understood that, although embodiments of the invention are described with reference to the specific vector friendly instruction format 200 in the context of the generic vector friendly instruction format 100 for illustrative purposes, the invention is not limited to the specific vector friendly instruction format 200 except where claimed. For example, the generic vector friendly instruction format 100 contemplates a variety of possible sizes for the various fields, while the specific vector friendly instruction format 200 is shown as having fields of specific sizes. By way of specific example, while the data element width field 164 is illustrated as a one bit field in the specific vector friendly instruction format 200, the invention is not so limited (that is, the generic vector friendly instruction format 100 contemplates other sizes of the data element width field 164).

The generic vector friendly instruction format 100 includes the following fields listed below in the order illustrated in FIG. 2A.

EVEX Prefix (Bytes 0-3) 202—is encoded in a four-byte form.

Format Field 140 (EVEX Byte 0, bits [7:0])—the first byte (EVEX Byte 0) is the format field 140 and it contains 0x62 (the unique value used for distinguishing the vector friendly instruction format in one embodiment of the invention).

The second-fourth bytes (EVEX Bytes 1-3) include a number of bit fields providing specific capability.

REX field 205 (EVEX Byte 1, bits [7-5])—consists of a EVEX.R bit field (EVEX Byte 1, bit [7]-R), EVEX.X bit field (EVEX byte 1, bit [6]-X), and 157BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 110—this is the first part of the REX' field 110 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 215 (EVEX byte 1, bits [3:0]-mmmm)—its content encodes an implied leading opcode byte (0F, 0F 38, or 0F 3).

Data element width field 164 (EVEX byte 2, bit [7]-W)—is represented by the notation EVEX.W. EVEX.W is used to define the granularity (size) of the datatype (either 32-bit data elements or 64-bit data elements).

EVEX.vvvv 220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 220 encodes the 4 low-order bits of the first source register specifier stored in inverted (1s complement) form. Depending on the instruction, an extra different EVEX bit field is used to extend the specifier size to 32 registers.

EVEX.U 168 Class field (EVEX byte 2, bit [2]-U)—If EVEX.U=0, it indicates class A or EVEX.U0; if EVEX.U=1, it indicates class B or EVEX.U1.

Prefix encoding field 225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 152 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 110—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 170 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 230 (Byte 4) is also known as the opcode byte. Part of the opcode is specified in this field.

MOD R/M Field 240 (Byte 5) includes MOD field 242, Reg field 244, and R/M field 246. As previously described, the MOD field's 242 content distinguishes between memory access and non-memory access operations. The role of Reg field 244 can be summarized to two situations: encoding either the destination register operand or a source register operand, or be treated as an opcode extension and not used to encode any instruction operand. The role of R/M field 246 may include the following: encoding the instruction operand that references a memory address, or encoding either the destination register operand or a source register operand.

Scale, Index, Base (SIB) Byte (Byte 6)—As previously described, the scale field's 150 content is used for memory address generation. SIB.xxx 254 and SIB.bbb 256—the contents of these fields have been previously referred to with regard to the register indexes Xxxx and Bbbb.

Displacement field 162A (Bytes 7-10)—when MOD field 242 contains 10, bytes 7-10 are the displacement field 162A, and it works the same as the legacy 32-bit displacement (disp32) and works at byte granularity.

Displacement factor field 162B (Byte 7)—when MOD field 242 contains 01, byte 7 is the displacement factor field 162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 162B is a reinterpretation of disp8; when using displacement factor field 162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 162B substitutes the legacy x86 instruction set 8-bit displacement. Thus, the displacement factor field 162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 172 operates as previously described.

Full Opcode Field

FIG. 2B is a block diagram illustrating the fields of the specific vector friendly instruction format 200 that make up the full opcode field 174 according to one embodiment of the invention. Specifically, the full opcode field 174 includes the format field 140, the base operation field 142, and the data element width (W) field 164. The base operation field 142 includes the prefix encoding field 225, the opcode map field 215, and the real opcode field 230.

Register Index Field

FIG. 2C is a block diagram illustrating the fields of the specific vector friendly instruction format 200 that make up the register index field 144 according to one embodiment of the invention. Specifically, the register index field 144 includes the REX field 205, the REX' field 210, the MODR/M.reg field 244, the MODR/M.r/m field 246, the VVVV field 220, xxx field 254, and the bbb field 256.

Augmentation Operation Field

Figure 2D:
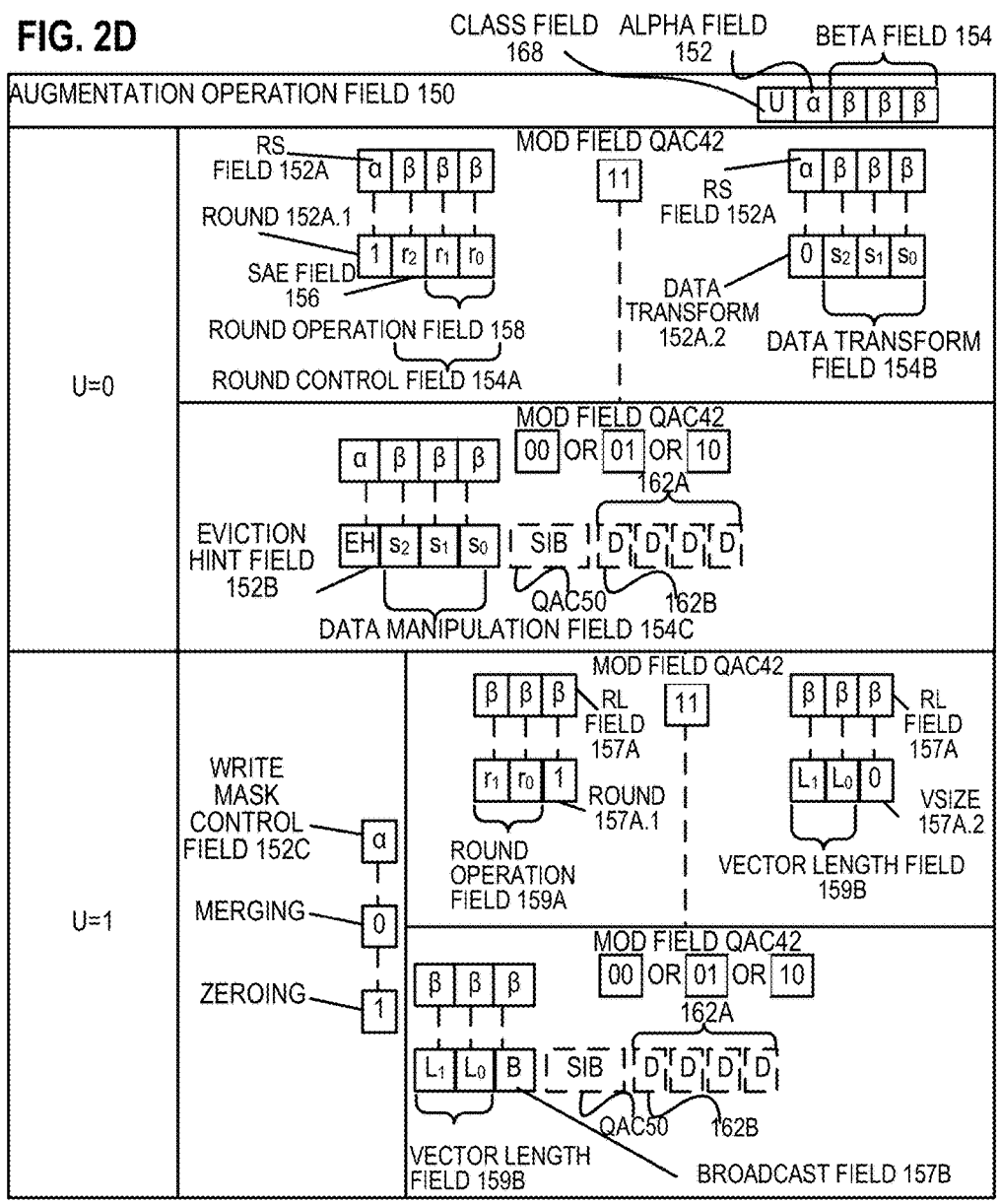

FIG. 2D is a block diagram illustrating the fields of the specific vector friendly instruction format 200 that make up the augmentation operation field 150 according to one embodiment of the invention. When the class (U) field 168 contains 0, it signifies EVEX.U0 (class A 168A); when it contains 1, it signifies EVEX.U1 (class B 168B). When U=0 and the MOD field 242 contains 11 (signifying a no memory access operation), the alpha field 152 (EVEX byte 3, bit [7]-EH) is interpreted as the rs field 152A. When the rs field 152A contains a 1 (round 152A.1), the beta field 154 (EVEX byte 3, bits [6:4]-SSS) is interpreted as the round control field 154A. The round control field 154A includes a one bit SAE field 156 and a two bit round operation field 158. When the rs field 152A contains a 0 (data transform 152A.2), the beta field 154 (EVEX byte 3, bits [6:4]-SSS) is interpreted as a three bit data transform field 154B. When U=0 and the MOD field 242 contains 00, 01, or 10 (signifying a memory access operation), the alpha field 152 (EVEX byte 3, bit [7]-EH) is interpreted as the eviction hint (EH) field 152B and the beta field 154 (EVEX byte 3, bits [6:4]-SSS) is interpreted as a three bit data manipulation field 154C.

When U=1, the alpha field 152 (EVEX byte 3, bit [7]-EH) is interpreted as the write mask control (Z) field 152C. When U=1 and the MOD field 242 contains 11 (signifying a no memory access operation), part of the beta field 154 (EVEX byte 3, bit [4]-$S_0$) is interpreted as the RL field 157A; when it contains a 1 (round 157A.1) the rest of the beta field 154 (EVEX byte 3, bit [6-5]-$S_{2-1}$) is interpreted as the round operation field 159A, while when the RL field 157A contains a 0 (VSIZE 157.A2) the rest of the beta field 154 (EVEX byte 3, bit [6-5]-$S_{2-1}$) is interpreted as the vector length field 159B (EVEX byte 3, bit [6-5]-$L_{1-0}$). When U=1 and the MOD field 242 contains 00, 01, or 10 (signifying a memory access operation), the beta field 154 (EVEX byte 3, bits [6:4]-SSS) is interpreted as the vector length field 159B (EVEX byte 3, bit [6-5]-$L_{1-0}$) and the broadcast field 157B (EVEX byte 3, bit [4]-B).

C. Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 200 operates on these overlaid register file as illustrated in the below tables.

| Adjustable Vector Length | Class | Operations | Registers |
|---|---|---|---|
| Instruction Templates that do not include the vector length field 159B | A (FIG. 1A; U = 0) | 110, 115, 125, 130 | zmm registers (the vector length is 64 byte) |
| | B (FIG. 1B; U = 1) | 112 | zmm registers (the vector length is 64 byte) |
| Instruction templates that do include the vector length field 159B | B (FIG. 1B; U = 1) | 117, 127 | zmm, ymm, or xmm registers (the vector length is 64 byte, 32 byte, or 16 byte) depending on the vector length field 159B |

In other words, the vector length field 159B selects between a maximum length and one or more other shorter lengths, where each such shorter length is half the length of the preceding length; and instructions templates without the vector length field 159B operate on the maximum vector length. Further, in one embodiment, the class B instruction templates of the specific vector friendly instruction format 200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 315—in the embodiment illustrated, there are 8 write mask registers (k0 through k7), each 64 bits in size. In an alternate embodiment, the write mask registers 315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

D. Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Figure 6:
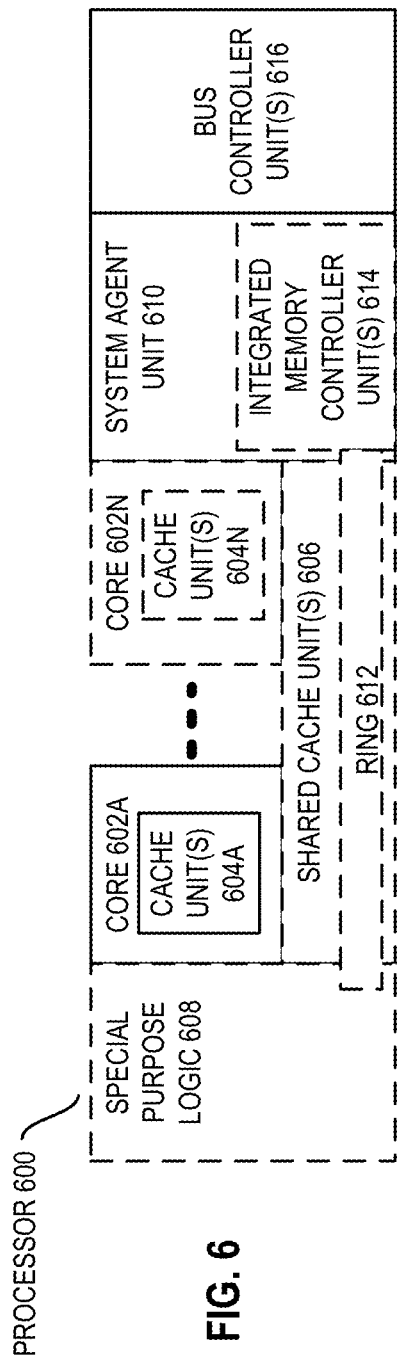
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
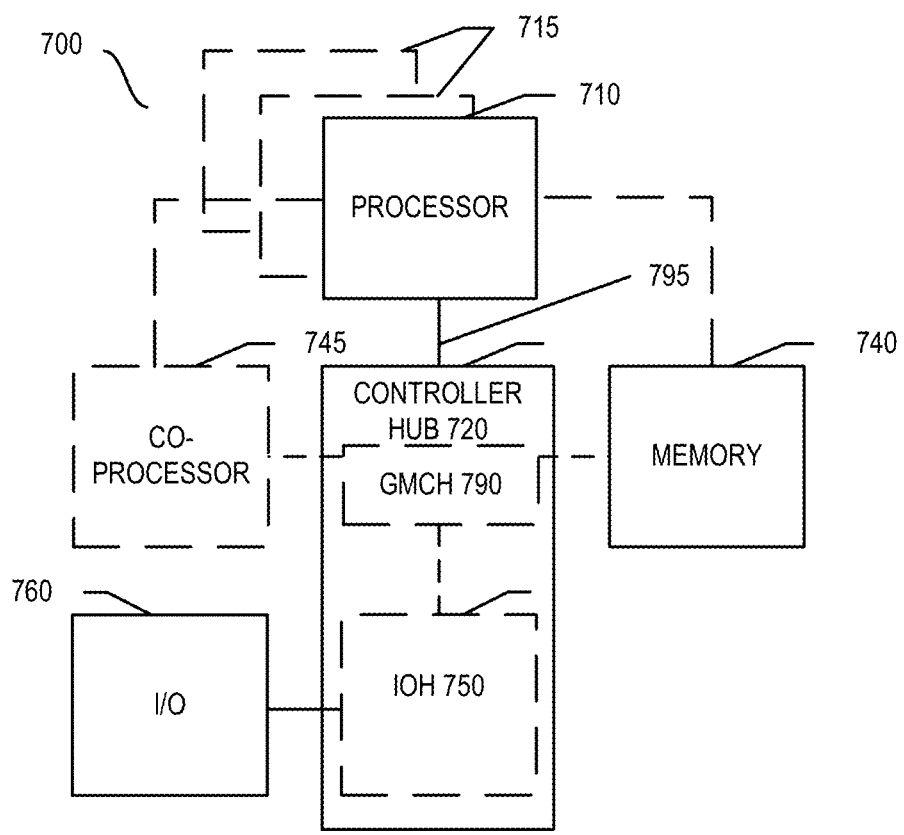
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
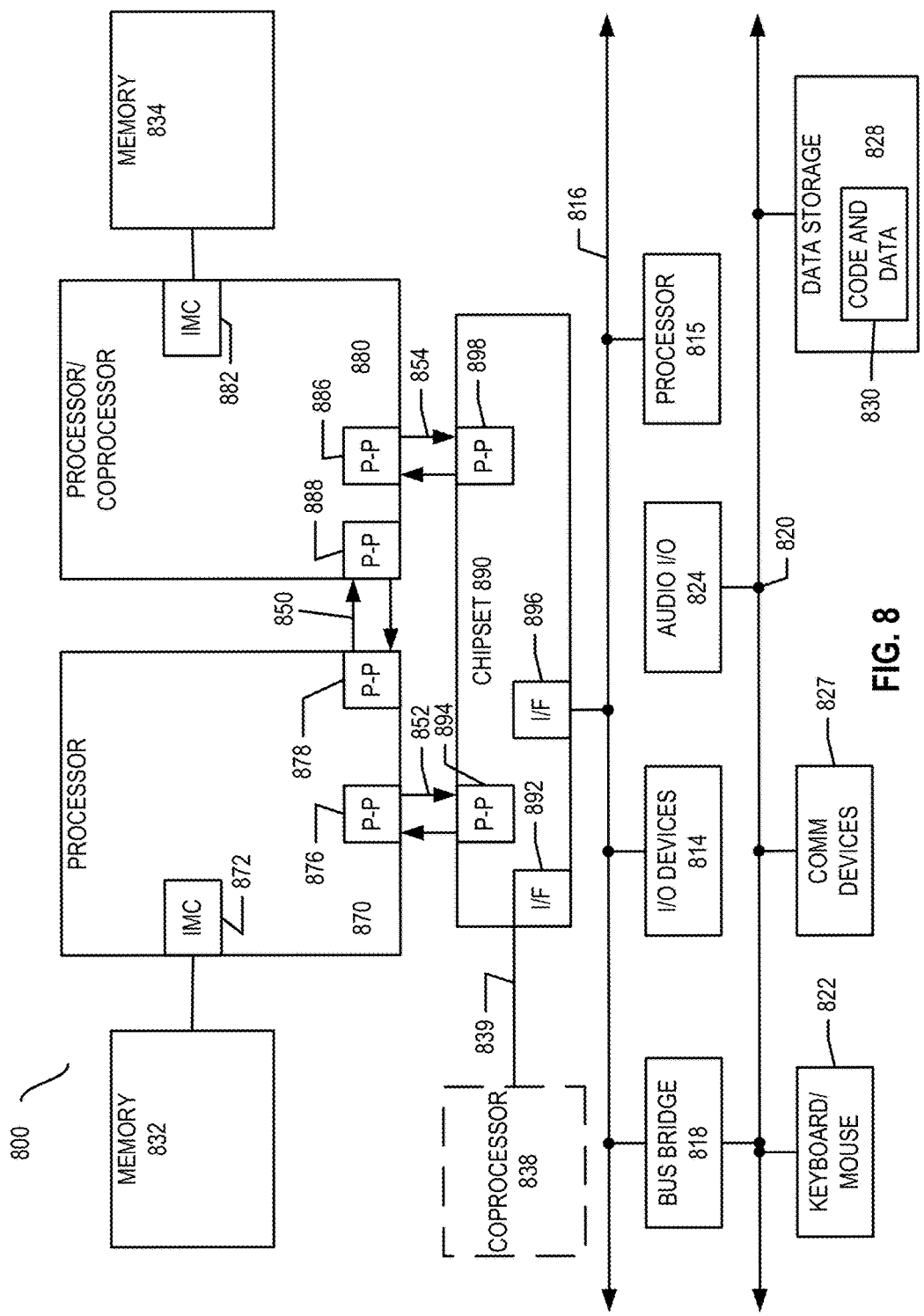
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
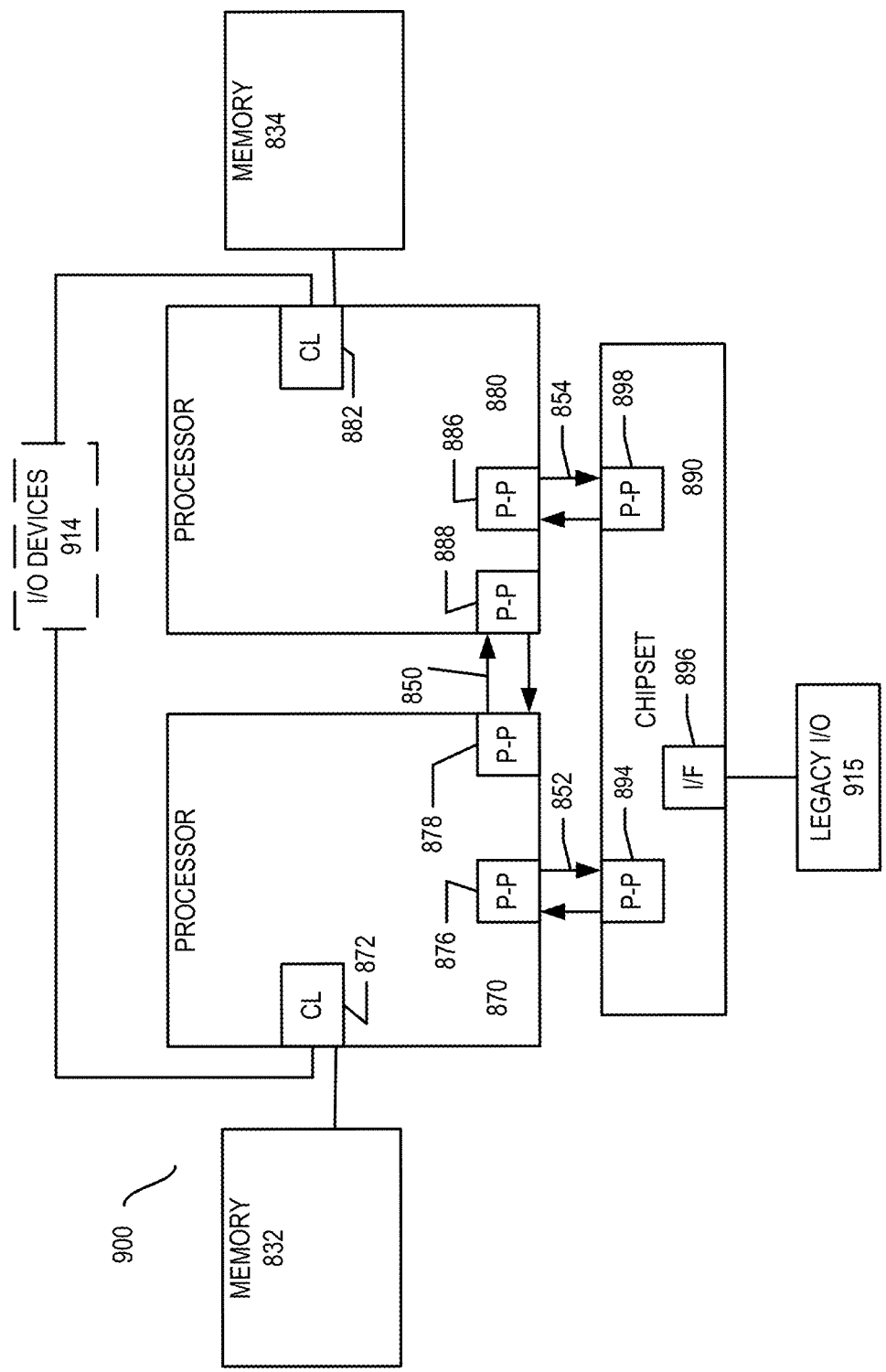
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
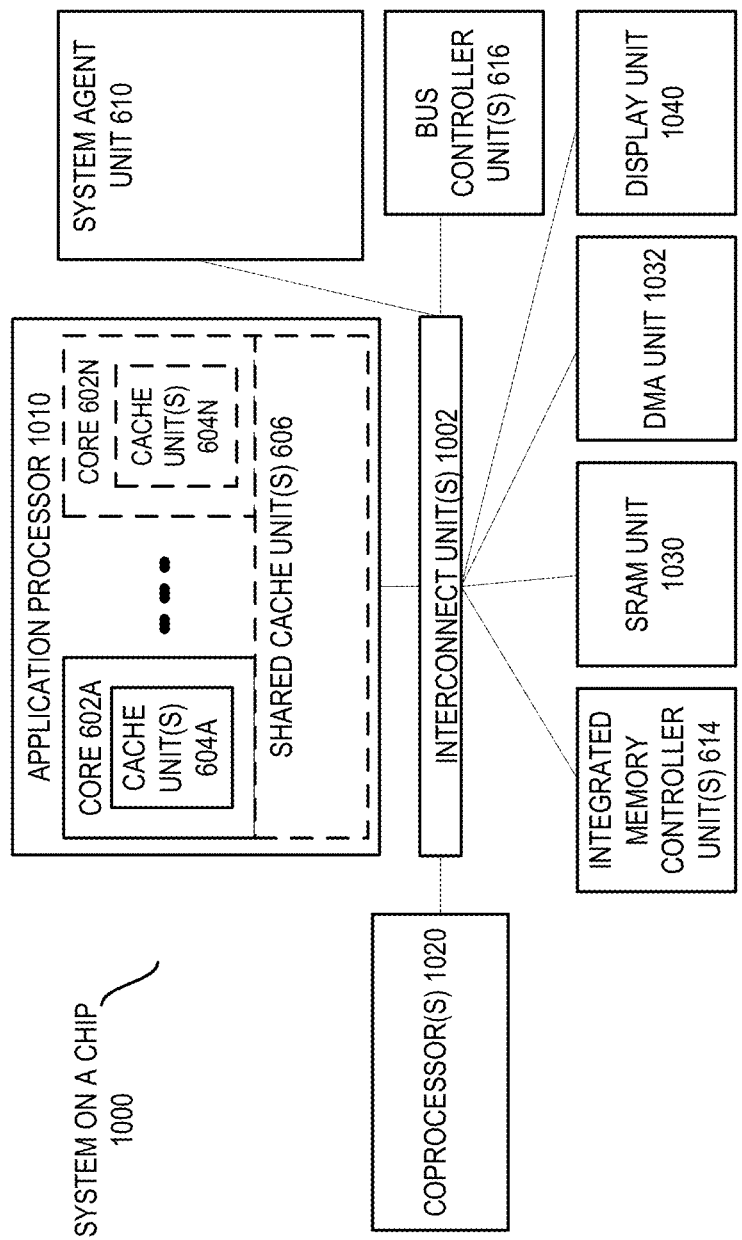
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
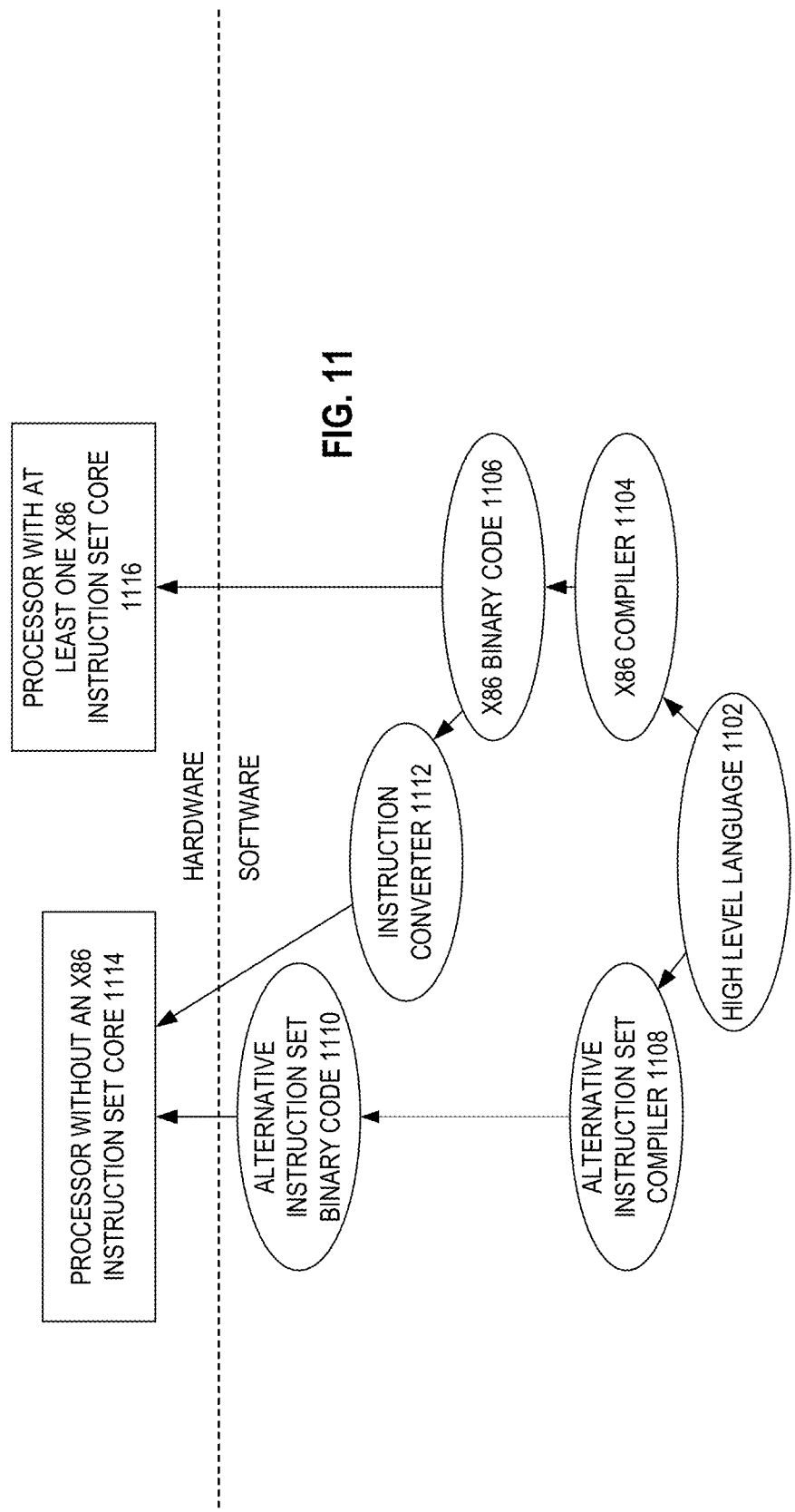
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

Apparatus and Method for Processing Sparse Data

Overview

In some implementations, an accelerator is coupled to processor cores or other processing elements to accelerate certain types of operations such as graphics operations, machine-learning operations, pattern analysis operations, and (as described in detail below) sparse matrix multiplication operations, to name a few. The accelerator may be communicatively coupled to the processor/cores over a bus or other interconnect (e.g., a point-to-point interconnect) or may be integrated on the same chip as the processor and communicatively coupled to the cores over an internal processor bus/interconnect. Regardless of the manner in which the accelerator is connected, the processor cores may allocate certain processing tasks to the accelerator (e.g., in the form of sequences of instructions or uops) which includes dedicated circuitry/logic for efficiently processing these tasks.

Accelerator Architecture for Sparse Matrix and Vector Operations

Figure 12:
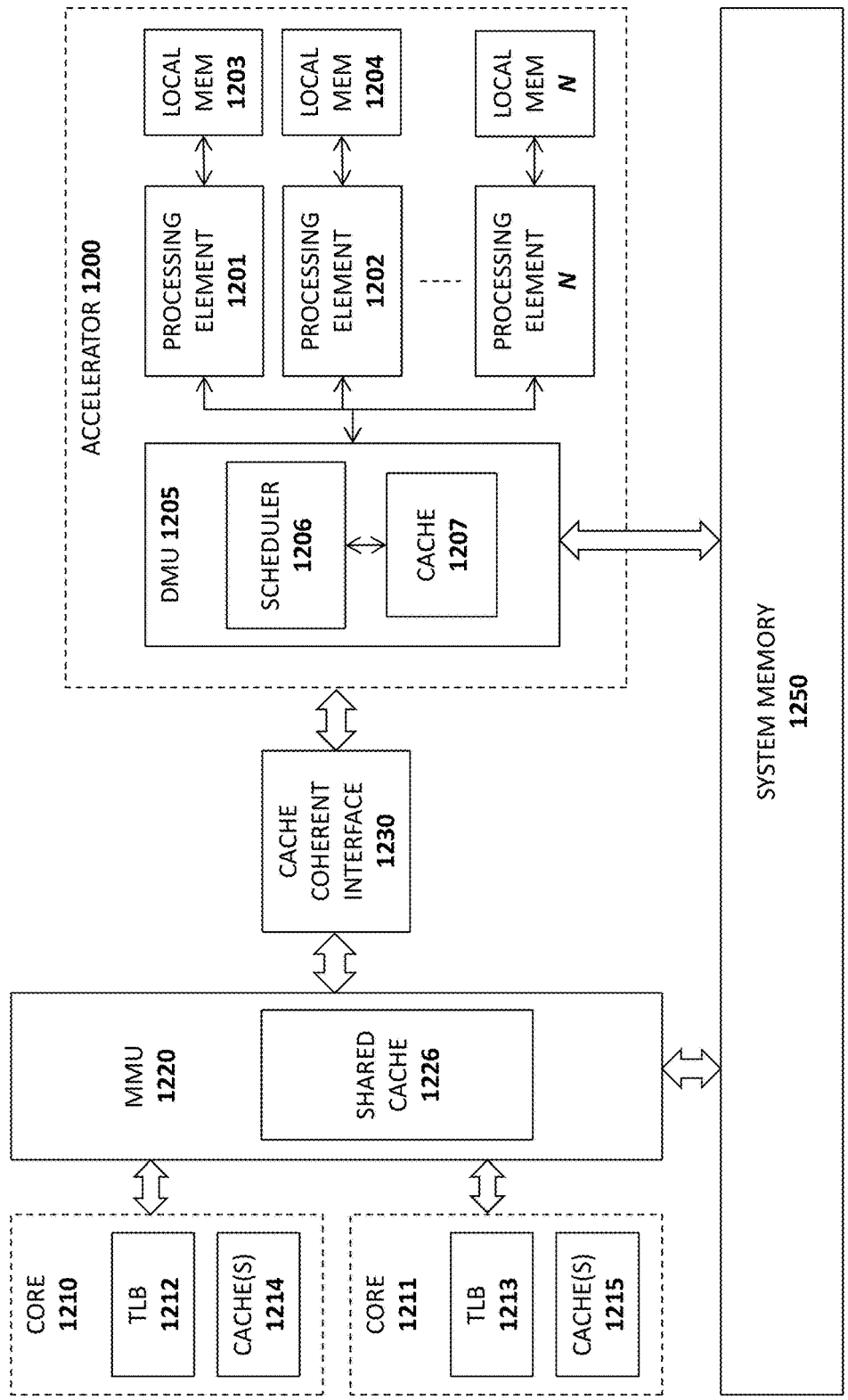
FIG. 12 illustrates an architecture on which embodiments of the invention may be implemented.

FIG. 12 illustrates an exemplary implementation in which an accelerator 1200 is communicatively coupled to a plurality of cores 1210-1211 through a cache coherent interface 1230. Each of the cores 1210-1211 includes a translation lookaside buffer 1212-1213 for storing virtual to physical address translations and one or more caches 1214-1215 (e.g., L1 cache, L2 cache, etc) for caching data and instructions. A memory management unit 1220 manages access by the cores 1210-1211 to system memory 1250 which may be a dynamic random access memory DRAM. A shared cache 1226 such as an L3 cache may be shared among the processor cores 1210-1211 and with the accelerator 1200 via the cache coherent interface 1230. In one implementation, the cores ATA1010T-1011, MMU 1220 and cache coherent interface 1230 are integrated on a single processor chip.

The illustrated accelerator 1200 includes a data management unit 1205 with a cache 1207 and scheduler 1206 for scheduling operations to a plurality of processing elements 1201-1202, N. In the illustrated implementation, each processing element has its own local memory 1203-1204, N. As described in detail below, each local memory 1203-1204, N may be implemented as a stacked DRAM or high bandwidth memory (HBM).

In one implementation, the cache coherent interface 1230 provides cache-coherent connectivity between the cores 1210-1211 and the accelerator 1200, in effect treating the accelerator as a peer of the cores 1210-1211. For example, the cache coherent interface 1230 may implement a cache coherency protocol to ensure that data accessed/modified by the accelerator 1200 and stored in the accelerator cache 1207 and/or local memories 1203-1204, N is coherent with the data stored in the core caches 1210-1211, the shared cache 1226 and the system memory 1250. For example, the cache coherent interface 1230 may participate in the snooping mechanisms used by the cores 1210-1211 and MMU 1220 to detect the state of cache lines within the shared cache 1226 and local caches 1214-1215 and may act as a proxy, providing snoop updates in response to accesses and attempted modifications to cache lines by the processing elements 1201-1202, N. In addition, when a cache line is modified by the processing elements 1201-1202, N, the cache coherent interface 1230 may update the status of the cache lines if they are stored within the shared cache 1226 or local caches 1214-1215.

In addition, to reduce the data traffic between the cores 1210-1211 and accelerator 1200, one embodiment tags data with an accelerator bias or a processor bias such as by setting a bit within a bias table at the granularity of a memory page. Memory pages with an accelerator bias may be processed by the accelerator 1200 without fully implementing the cache coherency protocol. The cores 1210-1211 will then refrain from modifying pages that have an accelerator bias without first notifying the accelerator 1200.

In one implementation, the data management unit 1005 includes memory management circuitry providing the accelerator 1200 access to system memory 1250 and the shared cache 1226. In addition, the data management unit 1205 may provide updates to the cache coherent interface 1230 and receiving updates from the cache coherent interface 1230 as needed (e.g., to determine state changes to cache lines). In the illustrated implementation, the data management unit 1205 includes a scheduler 1205 for scheduling instructions/operations to be executed by the processing elements 1201-1202, N. To perform its scheduling operations, the scheduler 1206 may evaluate dependences between instructions/operations to ensure that instructions/operations are executed in a coherent order (e.g., to ensure that a first instruction executes before a second instruction which is dependent on results from the first instruction). Instructions/operations which are not inter-dependent may be executed in parallel on the processing elements 1201-1202, N.

Figure 13:
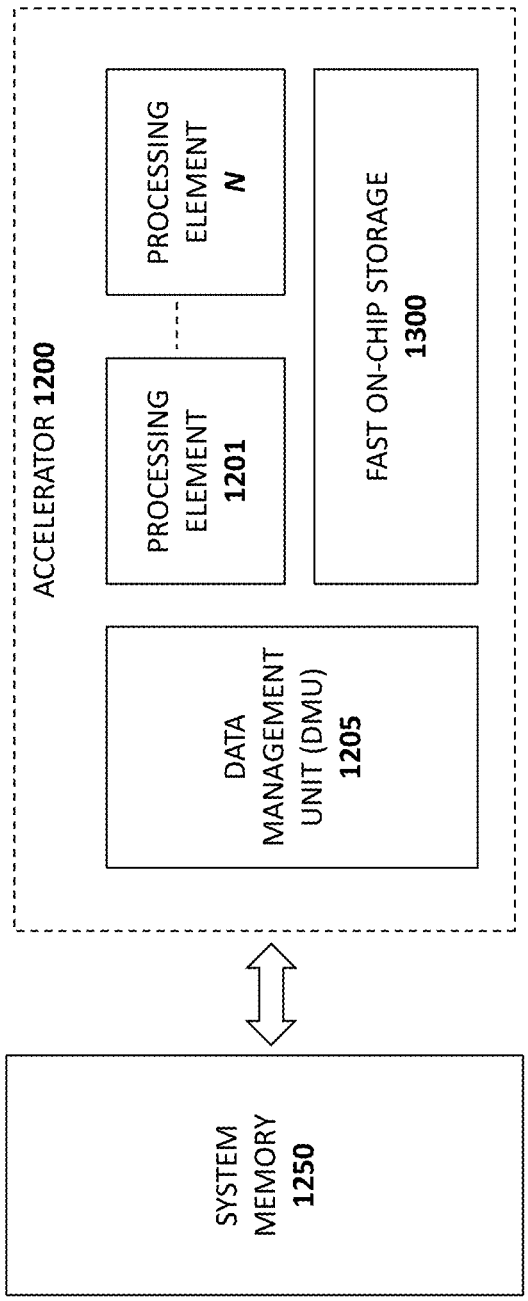
FIG. 13 illustrates one embodiment of an architecture for processing sparse data.

FIG. 13 illustrates another view of accelerator 1200 and other components previously described including a data management unit 1205, a plurality of processing elements 1201-N, and fast on-chip storage 1300 (e.g., implemented using stacked local DRAM in one implementation). In one implementation, the accelerator 1200 is a hardware accelerator architecture and the processing elements 1201-N include circuitry for performing matrix*vector and vector*vector operations, including operations for sparse/dense matrices. In particular, the processing elements 1201-N may include hardware support for column and row-oriented matrix processing and may include micro-architectural support for a "scale and update" operation such as that used in machine learning (ML) algorithms.

The described implementations perform matrix/vector operations which are optimized by keeping frequently used, randomly accessed, potentially sparse (e.g., gather/scatter) vector data in the fast on-chip storage 1300 and maintaining large, infrequently used matrix data in off-chip memory (e.g., system memory 1250), accessed in a streaming fashion whenever possible, and exposing intra/inter matrix block parallelism to scale up.

Implementations of the processing elements 1201-N process different combinations of sparse matrixes, dense matrices, sparse vectors, and dense vectors. As used herein, a "sparse" matrix or vector is a matrix or vector in which most of the elements are zero. By contrast, a "dense" matrix or vector is a matrix or vector in which most of the elements are non-zero. The "sparsity" of a matrix/vector may be defined based on the number of zero-valued elements divided by the total number of elements (e.g., m×n for an m×n matrix). In one implementation, a matrix/vector is considered "sparse" if its sparsity if above a specified threshold.

An exemplary set of operations performed by the processing elements 1201-N is illustrated in the table in FIG. 14. In particular the operation types include a first multiply 1400 using a sparse matrix, a second multiply 1401 using a dense matrix, a scale and update operation 1402m and a dot product operation 1403. Columns are provided for a first input operand 1410 and a second input operand 1411 (each of which may include sparse or dense matrix/vector); an output format 1413 (e.g., dense vector or scalar); a matrix data format (e.g., compressed sparse row, compressed sparse column, row-oriented, etc); and an operation identifier 1414.

The runtime-dominating compute patterns found in some current workloads include variations of matrix multiplication against a vector in row-oriented and column-oriented fashion. They work on well-known matrix formats: compressed sparse row (CSR) and compressed sparse column (CSC). FIG. 15a depicts an example of a multiplication between a sparse matrix A against a vector x to produce a vector y. FIG. 15b illustrates the CSR representation of matrix A in which each value is stored as a (value, row index) pair. For example, the (3,2) for row0 indicates that a value of 3 is stored in element position 2 for row 0. FIG. 15c illustrates a CSC representation of matrix A which uses a (value, column index) pair.

FIGS. 16a, 16b, and 16c illustrate pseudo code of each compute pattern, which is described below in detail. In particular, FIG. 16a illustrates a row-oriented sparse matrix dense vector multiply (spMdV_csr); FIG. 16b illustrates a column-oriented sparse matrix sparse vector multiply (spMspC_csc); and FIG. 16c illustrates a scale and update operation (scale_update).

A. Row-Oriented Sparse Matrix Dense Vector Multiplication (spMdV_csr)

This is a well-known compute pattern that is important in many application domains such as high-performance computing. Here, for each row of matrix A, a dot product of that row against vector x is performed, and the result is stored in the y vector element pointed to by the row index. This computation is used in a machine-learning (ML) algorithm that performs analysis across a set of samples (i.e., rows of the matrix). It may be used in techniques such as "mini-batch." There are also cases where ML algorithms perform only a dot product of a sparse vector against a dense vector (i.e., an iteration of the spMdV_csr loop), such as in the stochastic variants of learning algorithms.

A known factor that can affect performance on this computation is the need to randomly access sparse x vector elements in the dot product computation. For a conventional server system, when the x vector is large, this would result in irregular accesses (gather) to memory or last level cache.

To address this, one implementation of a processing element divides matrix A into column blocks and the x vector into multiple subsets (each corresponding to an A matrix column block). The block size can be chosen so that the x vector subset can fit on chip. Hence, random accesses to it can be localized on-chip.

B. Column-Oriented Sparse Matrix Sparse Vector Multiplication (spMspV_csc)

This pattern that multiplies a sparse matrix against a sparse vector is not as well-known as spMdV_csr. However, it is important in some ML algorithms. It is used when an algorithm works on a set of features, which are represented as matrix columns in the dataset (hence, the need for column-oriented matrix accesses).

In this compute pattern, each column of the matrix A is read and multiplied against the corresponding non-zero element of vector x. The result is used to update partial dot products that are kept at the y vector. After all the columns associated with non-zero x vector elements have been processed, the y vector will contain the final dot products.

While accesses to matrix A is regular (i.e., stream in columns of A), the accesses to the y vector to update the partial dot products is irregular. The y element to access depends on the row index of the A vector element being processed. To address this, the matrix A can be divided into row blocks. Consequently, the vector y can be divided into subsets corresponding to these blocks. This way, when processing a matrix row block, it only needs to irregularly access (gather/scatter) its y vector subset. By choosing the block size properly, the y vector subset can be kept on-chip.

C. Scale and Update (Scale_Update)

This pattern is typically used by ML algorithms to apply scaling factors to each sample in the matrix and reduced them into a set of weights, each corresponding to a feature (i.e., a column in A). Here, the x vector contains the scaling factors. For each row of matrix A (in CSR format), the scaling factors for that row are read from the x vector, and then applied to each element of A in that row. The result is used to update the element of y vector. After all rows have been processed, the y vector contains the reduced weights.

Similar to prior compute patterns, the irregular accesses to the y vector could affect performance when y is large. Dividing matrix A into column blocks and y vector into multiple subsets corresponding to these blocks can help localize the irregular accesses within each y subset.

Processor Element Architecture for Sparse Matrix and Vector Operations

Figure 17:
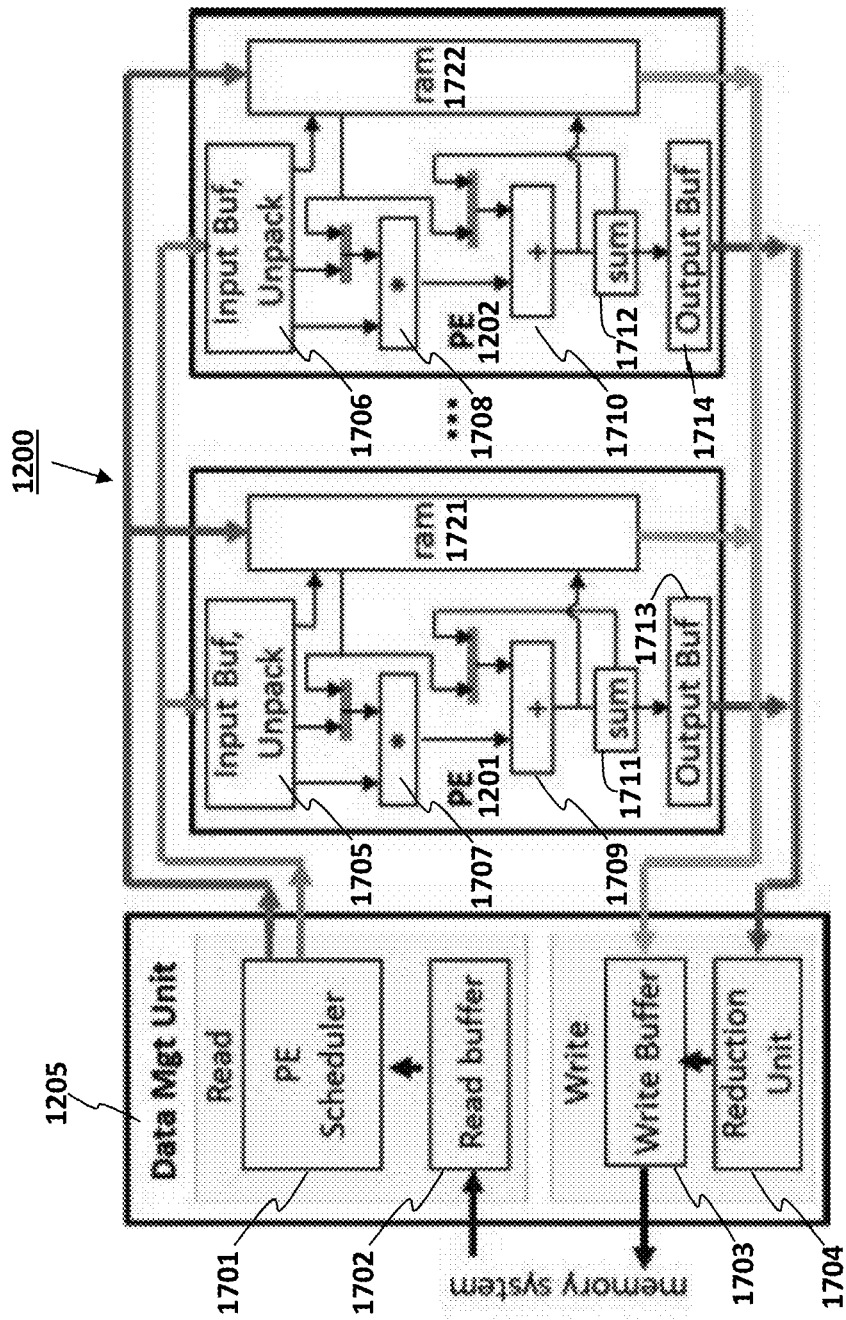
FIG. 17 illustrates a processor element architecture in one embodiment.

FIG. 17 illustrates one implementation of a hardware accelerator 1200 that can efficiently perform the compute patterns discussed above. The accelerator 1200 may be a hardware IP block that can be integrated with general purpose processors, similar to those found in existing accelerator-based solutions. In one implementation, the accelerator 1200 independently accesses memory 1250 through an interconnect shared with the processors to perform the compute patterns. It supports any arbitrarily large matrix datasets that reside in off-chip memory.

FIG. 17 illustrates an architecture and processing flow for one implementation of the data management unit 1205 and the processing elements 1201-1202. In this implementation, the data management unit 1205 includes a processing element scheduler 1701, a read buffer 1702, a write buffer 1703 and a reduction unit 1704. Each PE 1201-1202 includes an input buffer 1705-1706, a multiplier 1707-1708, an adder 1709-1710, a local RAM 1721-1722, a sum register 1711-1712, and an output buffer 1713-1714.

The accelerator supports the matrix blocking schemes discussed above (i.e., row and column blocking) to support any arbitrarily large matrix data. The accelerator is designed to process a block of matrix data. Each block is further divided into sub-blocks which are processed in parallel by the PEs 1201-1202.

In operation, the data management unit 1205 reads the matrix rows or columns from the memory subsystem into its read buffer 1702, which is then dynamically distributed by the PE scheduler 1701 across PEs 1201-1202 for processing. It also writes results to memory from its write buffer 1703.

Each PE 1201-1202 is responsible for processing a matrix sub-block. A PE contains an on-chip RAM 1721-1722 to store the vector that needs to be accessed randomly (i.e., a subset of x or y vector, as described above). It also contains a floating point multiply-accumulate (FMA) unit including multiplier 1707-1708 and adder 1709-1710 and unpack logic within input buffers 1705-1706 to extract matrix elements from input data, and a sum register 1711-1712 to keep the accumulated FMA results.

One implementation of the accelerator 1200 achieves extreme efficiencies because (1) it places sparse, irregularly accessed (gather/scatter) data in on-chip PE RAMs 1721-1722, (2) it utilizes a hardware PE scheduler 1701 to ensure PEs are well utilized, and (3) unlike with general purpose processors, the accelerator includes only the hardware resources that are essential for sparse matrix operations. Overall, the accelerator efficiently converts the available memory bandwidth provided to it into performance.

Scaling of performance can be done by employing more PEs in an accelerator block to process multiple matrix sub-blocks in parallel, and/or employing more accelerator blocks (each has a set of PEs) to process multiple matrix blocks in parallel. A combination of these options is considered below. The number of PEs and/or accelerator blocks should be tuned to match the memory bandwidth.

One implementation of the accelerator 1200 can be programmed through a software library (similar to Intel® Math Kernel Library). Such library prepares the matrix data in memory, sets control registers in the accelerator 1200 with information about the computation (e.g., computation type, memory pointer to matrix data), and starts the accelerator. Then, the accelerator independently accesses matrix data in memory, performs the computation, and writes the results back to memory for the software to consume.

Figure 18B:
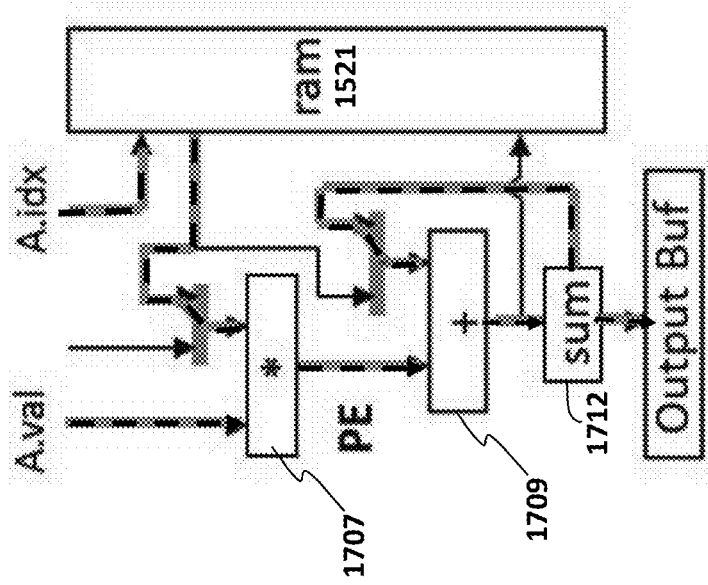
FIGS. 18a-b illustrates data flow in accordance with one embodiment.
Figure 18A:
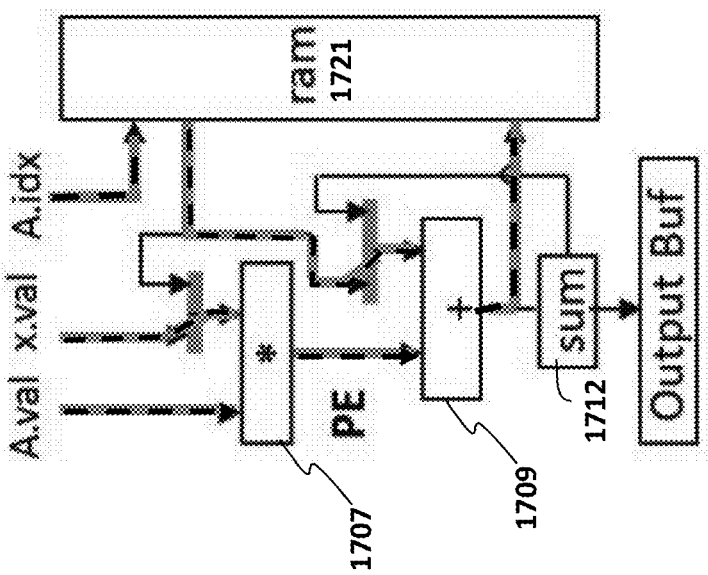

The accelerator handles the different compute patterns by setting its PEs to the proper datapath configuration, as depicted in FIGS. 18A-B. In particular, FIG. 18a highlights paths (using dotted lines) for spMspV_csc and scale_update operations and FIG. 18b illustrates paths for a spMdV_csr operation. The accelerator operation to perform each compute pattern is detailed below.

For spMspV_csc, the initial y vector subset is loaded in to PE's RAM 1721 by the DMU 1205. It then reads x vector elements from memory. For each x element, the DMU 1205 streams the elements of the corresponding matrix column from memory and supplies them to the PE 1201. Each matrix element contains a value (A.val) and an index (A.idx) which points to the y element to read from PE's RAM 1721. The DMU 1005 also provides the x vector element (x.val) that is multiplied against A.val by the multiply-accumulate (FMA) unit. The result is used to update the y element in the PE's RAM pointed to by A.idx. Note that even though not used by our workloads, the accelerator also supports column-wise multiplication against a dense x vector (spMdV_csc) by processing all matrix columns instead of only a subset (since x is dense).

The scale_update operation is similar to the spMspV_csc, except that the DMU 1205 reads the rows of an A matrix represented in a CSR format instead of a CSC format. For the spMdV_csr, the x vector subset is loaded in to the PE's RAM 1721. DMU 1205 streams in matrix row elements (i.e., {A.val,A.idx} pairs) from memory. A.idx is used to read the appropriate x vector element from RAM 1721, which is multiplied against A.val by the FMA. Results are accumulated into the sum register 1712. The sum register is written to the output buffer each time a PE sees a marker indicating an end of a row, which is supplied by the DMU 1205. In this way, each PE produces a sum for the row sub-block it is responsible for. To produce the final sum for the row, the sub-block sums produced by all the PEs are added together by the Reduction Unit 1704 in the DMU (see FIG. 17). The final sums are written to the output buffer 1713-1714, which the DMU 1005 then writes to memory.

Graph Data Processing

In one implementation, the accelerator architectures described herein are configured to process graph data. Graph analytics relies on graph algorithms to extract knowledge about the relationship among data represented as graphs. The proliferation of graph data (from sources such as social media) has led to strong demand for and wide use of graph analytics. As such, being able to do graph analytics as efficient as possible is of critical importance.

To address this need, one implementation automatically maps a user-defined graph algorithm to a hardware accelerator architecture "template" that is customized to the given input graph algorithm. The accelerator may comprise the architectures described above and may be implemented as a FPGA/ASIC, which can execute with extreme efficiency. In summary, one implementation includes:

(1) a hardware accelerator architecture template that is based on a generalized sparse matrix vector multiply (GSPMV) accelerator. It supports arbitrary graph algorithm because it has been shown that graph algorithm can be formulated as matrix operations.

(2) an automatic approach to map and tune a widely-used "vertex centric" graph programming abstraction to the architecture template.

There are existing sparse matrix multiply hardware accelerators, but they do not support customizability to allow mapping of graph algorithms.

One implementation of the design framework operates as follows.

(1) A user specifies a graph algorithm as "vertex programs" following vertex-centric graph programming abstraction. This abstraction is chosen as an example here due to its popularity. A vertex program does not expose hardware details, so users without hardware expertise (e.g., data scientists) can create it.

(2) Along with the graph algorithm in (1), one implementation of the framework accepts the following inputs:

a. The parameters of the target hardware accelerator to be generated (e.g., max amount of on-chip RAMs). These parameters may be provided by a user, or obtained from an existing library of known parameters when targeting an existing system (e.g., a particular FPGA board).

b. Design optimization objectives (e.g., max performance, min area)

c. The properties of the target graph data (e.g., type of graph) or the graph data itself. This is optional, and is used to aid in automatic tuning.

(3) Given above inputs, one implementation of the framework performs auto-tuning to determine the set of customizations to apply to the hardware template to optimize for the input graph algorithm, map these parameters onto the architecture template to produce an accelerator instance in synthesizable RTL, and conduct functional and performance validation of the generated RTL against the functional and performance software models derived from the input graph algorithm specification.

In one implementation, the accelerator architecture described above is extended to support execution of vertex programs by (1) making it a customizable hardware template and (2) supporting the functionalities needed by vertex program. Based on this template, a design framework is described to map a user-supplied vertex program to the hardware template to produce a synthesizable RTL (e.g., Verilog) implementation instance optimized for the vertex program. The framework also performs automatic validation and tuning to ensure the produced RTL is correct and optimized. There are multiple use cases for this framework.

For example, the produced synthesizable RTL can be deployed in an FPGA platform (e.g., Xeon-FPGA) to efficiently execute the given vertex program. Or, it can be refined further to produce an ASIC implementation.

Figures 19A, 19B, 19C, 19D, 19E:
FIGS. 19a-e illustrates graphing data and program code in accordance with one embodiment.

It is has been shown that graphs can be represented as adjacency matrices, and graph processing can be formulated as sparse matrix operations. FIGS. 19a-b shows an example of representing a graph as an adjacency matrix. Each non-zero in the matrix represents an edge among two nodes in the graph. For example, a 1 in row 0 column 2 represents an edge from node A to C.

One of the most popular models for describing computations on graph data is the vertex programming model. One implementation supports the vertex programming model variant from Graphmat software framework, which formulates vertex programs as generalized sparse matrix vector multiply (GSPMV). As shown in FIG. 19c, a vertex program consists of the types of data associated with edges/vertices in the graph (edata/vdata), messages sent across vertices in the graph (mdata), and temporary data (tdata) (illustrated in the top portion of program code); and stateless user-defined compute functions using pre-defined APIs that read and update the graph data (as illustrated in the bottom portion of program code).

FIG. 19d illustrates exemplary program code for executing a vertex program. Edge data is represented as an adjacency matrix A (as in FIG. 19b), vertex data as vector y, and messages as sparse vector x. FIG. 19e shows the GSPMV formulation, where the multiply( ) and add( ) operations in SPMV is generalized by user-defined PROCESS_MSG( ) and REDUCE( ).

One observation here is that the GSPMV variant needed to execute vertex program performs a column-oriented multiplication of sparse matrix A (i.e., adjacency matrix) against a sparse vector x (i.e., messages) to produce an output vector y (i.e., vertex data). This operation is referred to as col_spMspV (previously described with respect to the above accelerator).

Design Framework.

Figure 20:
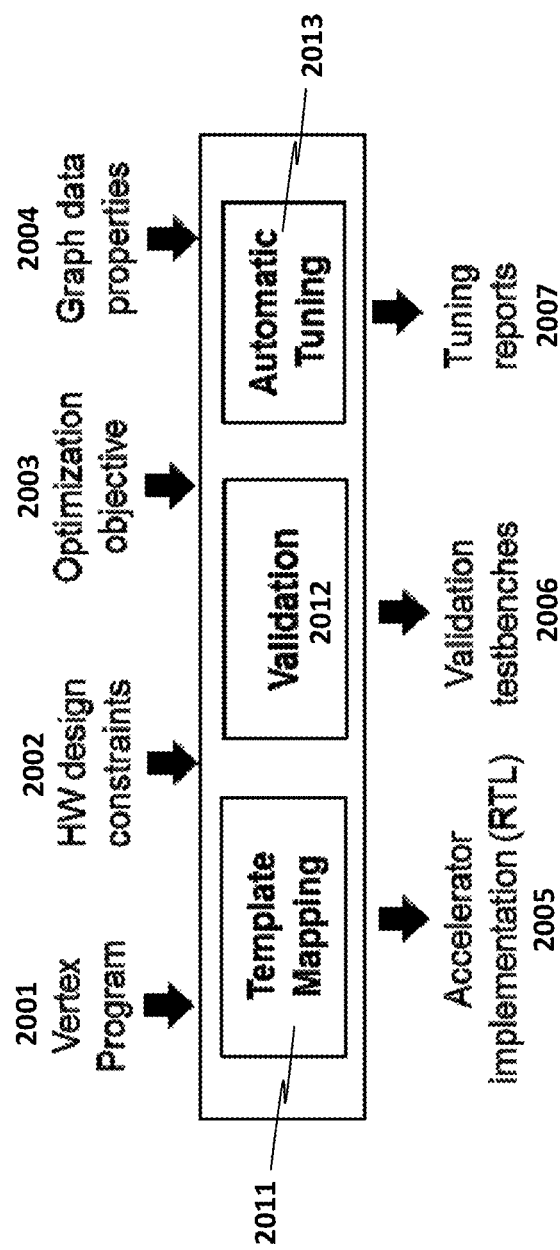
FIG. 20 illustrates template mapping, validation, and automatic tuning employed in one embodiment.

One implementation of the framework is shown in FIG. 20 which includes a template mapping component 2011, a validation component 2012 and an automatic tuning component 2013. Its inputs are a user-specified vertex program 2001, design optimization objectives 2003 (e.g., max performance, min area), and target hardware design constraints 2002 (e.g., maximum amount of on-chip RAMs, memory interface width). As an optional input to aid automatic-tuning, the framework also accepts graph data properties 2004 (e.g., type=natural graph) or a sample graph data.

Given these inputs, the template mapping component 2011 of the framework maps the input vertex program to a hardware accelerator architecture template, and produces an RTL implementation 2005 of the accelerator instance optimized for executing the vertex program 2001. The automatic tuning component 2013 performs automatic tuning 2013 to optimize the generated RTL for the given design objectives, while meeting the hardware design constraints. Furthermore, the validation component 2012 automatically validates the generated RTL against functional and performance models derived from the inputs. Validation test benches 2006 and tuning reports 2007 are produced along with the RTL.

Figure 21:
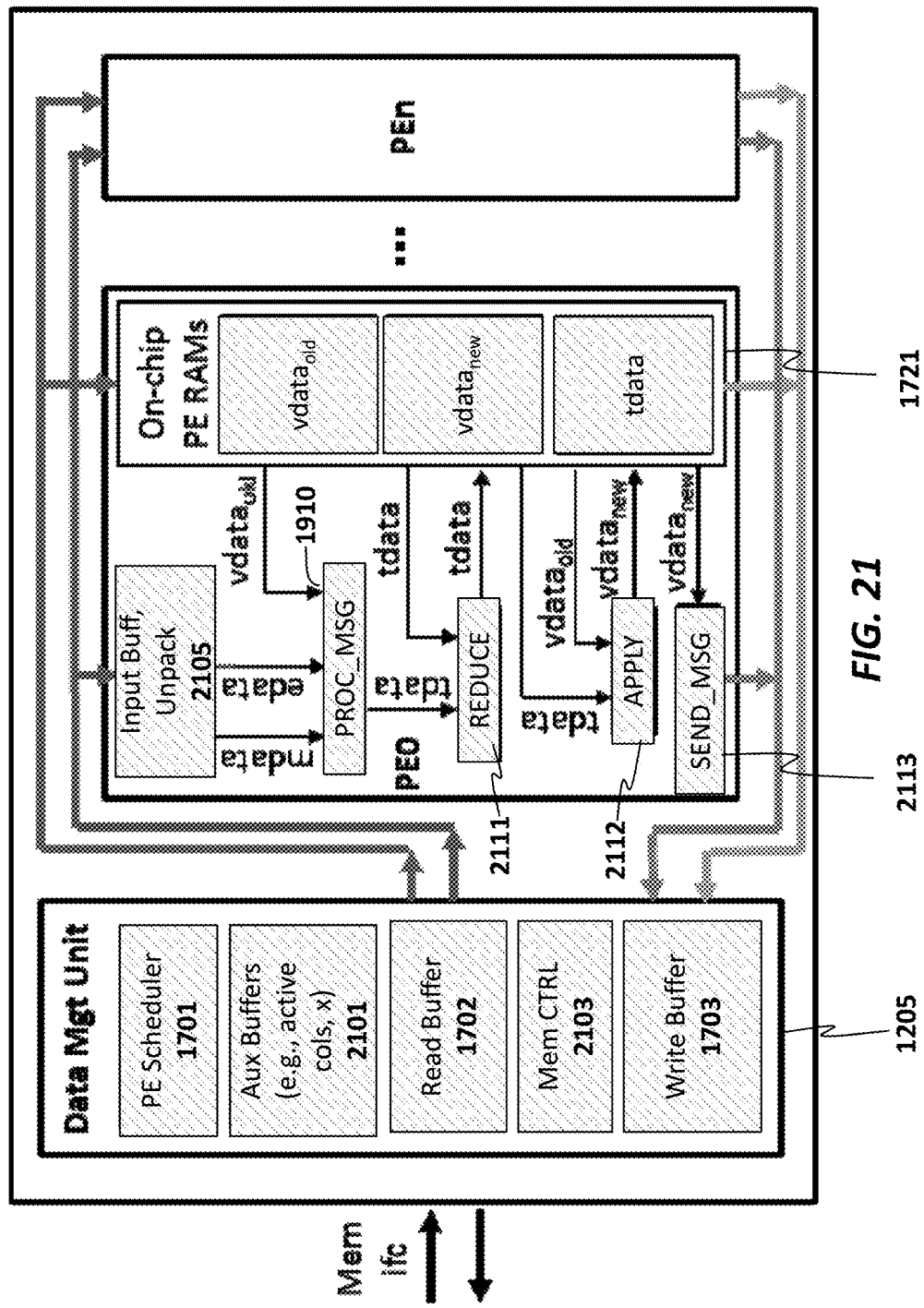
FIG. 21 illustrates one embodiment of a data management unit and processor element architecture.

Generalized Sparse Matrix Vector Multiply (GSPMV) Hardware Architecture Template One implementation of an architecture template for GSPMV is shown in FIG. 21, which is based on the accelerator architecture described above (see, e.g., FIG. 17 and associated text). Many of the components illustrated in FIG. 21 are customizable (as highlighted with grey lines). In one implementation, the architecture to support execution of vertex programs has been extended as follows.

Customizable logic blocks are provided inside each PE to support PROCESS_MSG( ) 1910, REDUCE( ) 2111, APPLY 2112, and SEND_MSG( ) 2113 needed by the vertex program. In addition, one implementation provides customizable on-chip storage structures and pack/unpack logic 2105 to support user-defined graph data (i.e., vdata, edata, mdata, tdata). The data management unit 1205 illustrated in FIG. 21 includes a PE scheduler 1701 (for scheduling PEs as described above), aux buffers 2101 for storing active column, x data), a read buffer 1702, a memory controller 2103 for controlling access to system memory, and a write buffer 1704. In addition, in the implementation shown in FIG. 21 old and new vdata and tdata is stored within the local PE memory 1721. Various control state machines may be modified to support executing vertex programs, abiding to the functionalities specified by the algorithms in FIGS. 19d and 19e.

Figure 22:
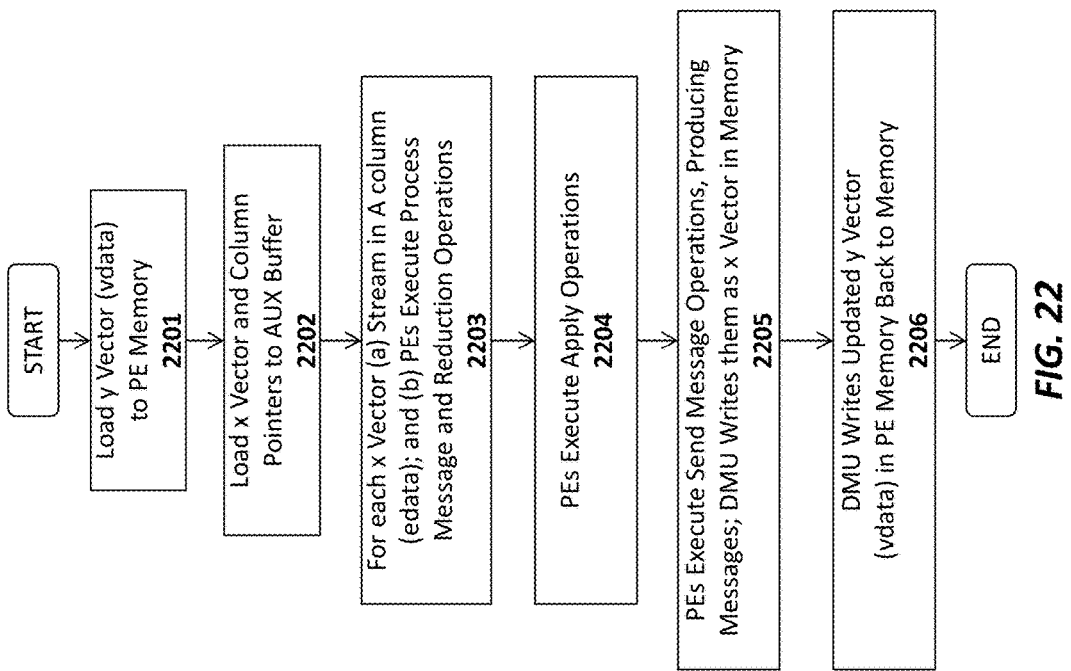
FIG. 22 illustrates a method in accordance with one embodiment of the invention.

The operation of each accelerator tile is summarized in FIG. 22. At 2201, the y vector (vdata) is loaded to the PE RAM 1721. At 2202, the x vector and column pointers are loaded to the aux buffer 2101. At 2203, for each x vector element, the A column is streamed in (edata) and the PEs execute PROC_MSG( ) 2110 and REDUCE( ) 2111. At 2204, the PEs execute APPLY( ) 2112. At 2205, the PEs execute SEND_MSG( ) 2113, producing messages, and the data management unit 1205 writes them as x vectors in memory. At 2206, the data management unit 1205 writes the updated y vectors (vdata) stored in the PE RAMs 1721 back to memory. The above techniques conform to the vertex program execution algorithm shown in FIGS. 19d and 19e. To scale up performance, the architecture allows increasing the number of PEs in a tile and/or the number of tiles in the design. This way, the architecture can take advantage of multiple levels of parallelisms in the graph (i.e., across subgraphs (across blocks of adjacency matrix) or within each subgraph). The Table in FIG. 23a summarizes the customizable parameters of one implementation of the template. It is also possible to assign asymmetric parameters across tiles for optimization (e.g., one tile with more PEs than another tile).

Automatic Mapping, Validation, and Tuning

Tuning.

Based on the inputs, one implementation of the framework performs automatic tuning to determine the best design parameters to use to customize the hardware architecture template in order to optimize it for the input vertex program and (optionally) graph data. There are many tuning considerations, which are summarized in the table in FIG. 23b. As illustrated, these include locality of data, graph data sizes, graph compute functions, graph data structure, graph data access attributes, graph data types, and graph data patterns.

Template Mapping.

In this phase, the framework takes the template parameters determined by the tuning phase, and produces an accelerator instance by "filling" in the customizable portions of the template. The user-defined compute functions (e.g., FIG. 19c) may be mapped from the input specification to the appropriate PE compute blocks using existing High-Level Synthesis (HLS) tools. The storage structures (e.g., RAMs, buffers, cache) and memory interfaces are instantiated using their corresponding design parameters. The pack/unpack logic may automatically be generated from the data type specifications (e.g., FIG. 19a). Parts of the control finite state machines (FSMs) are also generated based on the provided design parameters (e.g., PE scheduling schemes).

Validation.

In one implementation, the accelerator architecture instance (synthesizable RTL) produced by the template mapping is then automatically validated. To do this, one implementation of the framework derives a functional model of the vertex program to be used as the "golden" reference. Test benches are generated to compare the execution of this golden reference against simulations of the RTL implementation of the architecture instance. The framework also performs performance validation by comparing RTL simulations against analytical performance model and cycle-accurate software simulator. It reports runtime breakdown and pinpoint the bottlenecks of the design that affect performance.

Figure 24:
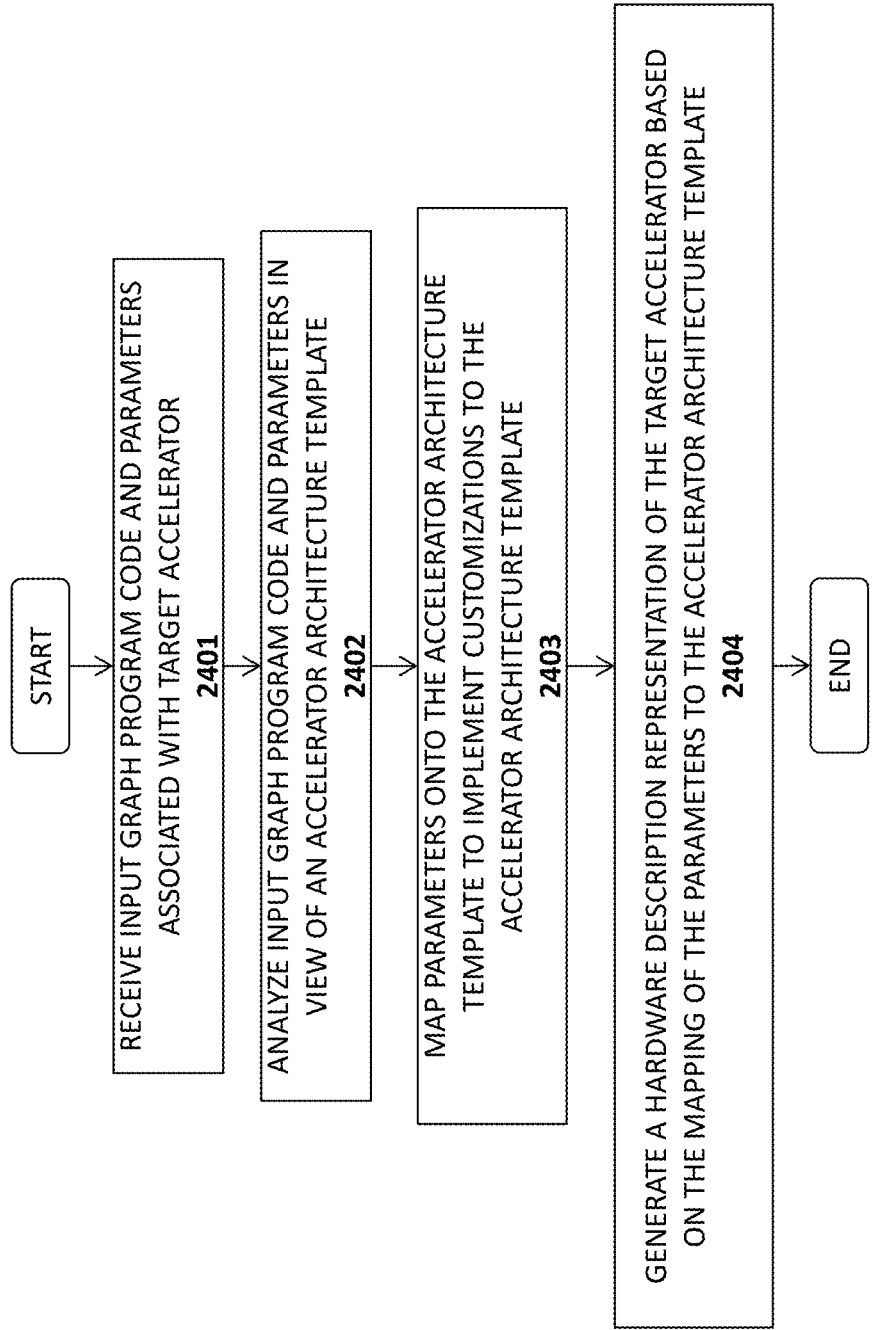
FIG. 24 illustrates one embodiment of a method in accordance with one embodiment of the invention.

One embodiment of a method is illustrated in FIG. 24. The method may be implemented on the processor and system architectures described above but is not limited to any particular architecture.

At 2401, input graph program code and parameters associated with the target accelerator are received (e.g., the amount of on-chip memory, etc). In addition, at this stage design optimization objectives may also be received such as a maximum performance level and/or minimum silicon area for the target accelerator. At 2402, the input graph program code and parameters are analyzed in view of an accelerator architecture template. For example, the accelerator architecture template may comprise customizable logic blocks usable to generate the hardware description representation (e.g., logic blocks defining on-chip storage structures and pack/unpack logic to support user-defined graph data). At 2403 parameters are mapped onto the architecture template to implement the customizations. The customizations may also be applied using parameters based on the design optimization objectives. As discussed above, the mapping of parameters modifies the architecture template in accordance with implementation-specific requirements. As illustrated in FIG. 21, parameters may be mapped to various components within the accelerator architecture template including within the data management unit 1205, processing element, and on-chip memory 1721 (as highlighted by diagonal lines). At 2404, a hardware description representation is generated for the target accelerator based on the mapping of the parameters to customize the accelerator architecture template. For example, in one embodiment, the hardware description representation comprises RTL code as discussed above.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A non-transitory machine-readable medium having program code stored thereon which, when executed by a processor, causes the processor to perform the operations of:
analyzing input graph program code and parameters associated with a target accelerator in view of an accelerator architecture template;
responsively mapping the parameters onto the architecture template to implement customizations to the accelerator architecture template; and
generating a hardware description representation of the target accelerator based on the determined mapping of the parameters to apply to the accelerator architecture template.

2. The machine-readable medium as in claim 1 wherein the hardware description representation comprises synthesizable register-transfer level (RTL) code.

3. The machine-readable medium as in claim 1 wherein at least one of the parameters comprises a maximum amount of on-chip memory for the target accelerator.

4. The machine-readable medium as in claim 1 further comprising program code to cause the machine to perform the operations of:
analyzing design optimization objectives associated with the target accelerator and determining the set of customizations, in part, based on the design optimization objectives.

5. The machine-readable medium as in claim 4 wherein the design optimization objectives include a maximum performance level and/or a minimum silicon area for the target accelerator.

6. The machine-readable medium as in claim 1 further comprising program code to cause the machine to perform the operations of:
analyzing design optimization objectives associated with the target accelerator and determining the set of customizations, in part, based on the design optimization objectives.

7. The machine-readable medium as in claim 1 wherein the input graph program code comprises a vertex-centric graph programming abstraction.

8. The machine-readable medium as in claim 1 wherein the program code is to cause the machine to perform the additional operations of:
validating function and performance of the generated hardware description representation.

9. The machine-readable medium as in claim 4 wherein the program code is to cause the machine to perform the additional operations of:
performing automatic tuning to optimize the generated hardware description representation based on the design optimization objectives.

10. The machine-readable medium as in claim 9 wherein automatic tuning is performed based on tuning considerations including locality of data, graph data sizes, graph compute functions, graph data structure, graph data access attributes, graph data types, and/or graph data patterns.

11. The machine-readable medium as in claim 1 wherein the accelerator architecture template comprises customizable logic blocks usable to generate the hardware description representation.

12. The machine-readable medium as in claim 11 wherein the customizable logic blocks define functional units within a plurality of processing elements of the target accelerator.

13. The machine-readable medium as in claim 12 wherein the functional units comprise a first functional unit to receive messages to other processing elements, a second functional unit to support reduction operations, a third functional unit to execute a specified sequent of operations on data, and a fourth functional unit to send messages to other processing elements.

14. The machine-readable medium as in claim 12 wherein the customizable logic blocks define on-chip storage structures and pack/unpack logic to support user-defined graph data.

15. A method comprising:
analyzing input graph program code and parameters associated with a target accelerator in view of an accelerator architecture template;
responsively mapping the parameters onto the architecture template to implement customizations to the accelerator architecture template; and
generating a hardware description representation of the target accelerator based on the determined mapping of the parameters to apply to the accelerator architecture template.

16. The method as in claim 15 wherein the hardware description representation comprises synthesizable register-transfer level (RTL) code.

17. The method as in claim 15 wherein at least one of the parameters comprises a maximum amount of on-chip memory for the target accelerator.

18. The method as in claim 15 further comprising:
analyzing design optimization objectives associated with the target accelerator and determining the set of customizations, in part, based on the design optimization objectives.

19. The method as in claim 18 wherein the design optimization objectives include a maximum performance level and/or a minimum silicon area for the target accelerator.

20. The method as in claim 15 further comprising:
analyzing design optimization objectives associated with the target accelerator and determining the set of customizations, in part, based on the design optimization objectives.

21. The method as in claim 15 wherein the input graph program code comprises a vertex-centric graph programming abstraction.

22. An apparatus comprising:
a memory for storing program code and data;
a processor for executing the program code and processing the data to perform the operations of:
analyzing input graph program code and parameters associated with a target accelerator in view of an accelerator architecture template;
responsively mapping the parameters onto the architecture template to implement customizations to the accelerator architecture template; and
generating a hardware description representation of the target accelerator based on the determined mapping of the parameters to apply to the accelerator architecture template.

23. The apparatus as in claim 22 wherein the hardware description representation comprises synthesizable register-transfer level (RTL) code.

* * * * *